(12) United States Patent
Kuroiwa et al.

(10) Patent No.: US 11,708,273 B2
(45) Date of Patent: Jul. 25, 2023

(54) ALUMINUM-CONTAINING SILICA SOL DISPERSED IN NITROGEN-CONTAINING SOLVENT AND RESIN COMPOSITION

(71) Applicant: NISSAN CHEMICAL CORPORATION, Tokyo (JP)

(72) Inventors: Kazuya Kuroiwa, Sodegaura (JP); Hikaru Onishi, Sodegaura (JP); Yuki Sugawara, Sodegaura (JP); Naohiko Suemura, Sodegaura (JP)

(73) Assignee: NISSAN CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 17/788,011

(22) PCT Filed: Nov. 4, 2021

(86) PCT No.: PCT/JP2021/040649
§ 371 (c)(1),
(2) Date: Jun. 22, 2022

(87) PCT Pub. No.: WO2022/097694
PCT Pub. Date: May 12, 2022

(65) Prior Publication Data
US 2023/0045117 A1 Feb. 9, 2023

(30) Foreign Application Priority Data
Nov. 4, 2020 (JP) .................................. 2020-184448

(51) Int. Cl.
*C01B 33/145* (2006.01)
*C09D 7/62* (2018.01)
(Continued)

(52) U.S. Cl.
CPC .......... *C01B 33/145* (2013.01); *C01B 33/146* (2013.01); *C09D 7/62* (2018.01); *C09D 179/08* (2013.01); *H01B 3/30* (2013.01)

(58) Field of Classification Search
None
See application file for complete search history.

(56) References Cited

U.S. PATENT DOCUMENTS 2,892,797 A * 6/1959 Alexander ............ C01B 33/149
516/79
5,587,871 A * 12/1996 Ue ........................ H01G 9/022
361/523
(Continued)

FOREIGN PATENT DOCUMENTS

JP 2005-200294 A 7/2005
JP 2011-026183 A 2/2011
(Continued)

OTHER PUBLICATIONS

Dec. 14, 2021 International Search Report issued in International Patent Application No. PCT/JP2021/040649.
(Continued)

*Primary Examiner* — Colin W. Slifka
*Assistant Examiner* — Michael Forrest
(74) *Attorney, Agent, or Firm* — Oliff PLC

(57) ABSTRACT

A silica sol dispersed in a nitrogen-containing solvent and a silica-containing resin composition containing a nitrogen atom-containing polymer. A silica sol including silica particles containing aluminum atoms and having an average primary particle diameter of 5 to 100 nm, the silica particles being dispersed in a nitrogen-containing solvent, wherein the aluminum atoms are bonded to the surfaces of the silica particles in an amount in terms of $Al_2O_3$ of 800 to 10,000 ppm/$SiO_2$. The silica particles are bonded to a silane compound or a hydrolysate of the silane compound. The nitro-
(Continued)

gen-containing solvent is an amide solvent. The nitrogen-containing solvent is dimethylacetamide, dimethylformamide, N-methylpyrrolidone, or N-ethylpyrrolidone. The insulating resin composition includes the silica sol and a nitrogen-containing polymer. The nitrogen-containing polymer is polyimide, polyamide, polyamic acid, polyamideimide, polyetherimide, or polyesterimide. An insulation-coated conductor wire produced by insulation coating of a conductor wire with the insulating resin composition.

22 Claims, 3 Drawing Sheets

(51) Int. Cl.
  *C01B 33/146* (2006.01)
  *C09D 179/08* (2006.01)
  *H01B 3/30* (2006.01)

(56) References Cited

U.S. PATENT DOCUMENTS

| | | |
|---|---|---|
| 2005/0154124 A1 | 7/2005 | Yoshitake et al. |
| 2010/0137475 A1 | 6/2010 | Takeyama et al. |
| 2010/0311871 A1 | 12/2010 | Suemura et al. |
| 2012/0103231 A1* | 5/2012 | Ishihara .............. C09D 179/04 106/287.11 |
| 2015/0225609 A1 | 8/2015 | Ishihara et al. |
| 2016/0137789 A1* | 5/2016 | Suenaga .............. C07C 235/84 428/458 |
| 2020/0286644 A1* | 9/2020 | Suemura ............. C01B 33/1435 |

FOREIGN PATENT DOCUMENTS

| | | |
|---|---|---|
| WO | 2009-008509 A1 | 1/2009 |
| WO | 2009/101974 A1 | 8/2009 |
| WO | 2011/059081 A1 | 5/2011 |
| WO | WO-2019050008 A1 * | 3/2019 ......... C01B 33/1417 |

OTHER PUBLICATIONS

Dec. 14, 2021 Written Opinion of the International Searching Authority issued in International Patent Application No. PCT/JP2021/040649.

Jan. 9, 2023 Office Action issued in European Application No. 21 889 246.1.

Dec. 15, 2022 Office Action issued in Korean Application No. 10-2022-7019886.

* cited by examiner

ALUMINUM-CONTAINING SILICA SOL DISPERSED IN NITROGEN-CONTAINING SOLVENT AND RESIN COMPOSITION

TECHNICAL FIELD

The present invention relates to an aluminum-containing silica sol dispersed in a nitrogen-containing solvent, and a resin composition (in particular, an insulating resin composition) containing the silica sol and a nitrogen-containing polymer.

BACKGROUND ART

There has been disclosed a method in which hydroxyl groups on the surfaces of particles of an inorganic oxide such as silica are reacted with an alcohol to introduce alkoxysilyl groups (i.e., organification), and the resultant inorganic oxide particles are dispersed in an organic solvent such as toluene, to thereby produce an inorganic oxide sol. The disclosed method produces a silica sol dispersed in toluene solvent by reacting a silica sol dispersed in methanol with phenyltrimethoxysilane (see Patent Document 1).

There has also been disclosed a silica sol produced by subjecting a silica sol dispersed in methanol to solvent replacement with acetonitrile to prepare a silica sol dispersed in a mixed solvent of acetonitrile and methanol, and then reacting the dispersed silica sol with phenyltrimethoxysilane (see Patent Document 2).

There has also been disclosed a silica sol wherein the surfaces of silica particles are modified with an aluminum compound (see Patent Document 3).

PRIOR ART DOCUMENTS

Patent Documents

Patent Document 1: JP 2005-200294 A
Patent Document 2: WO 2009-008509 pamphlet
Patent Document 3: JP 2011-026183 A

SUMMARY OF THE INVENTION

Problems to be Solved by the Invention

An object of the present invention is to produce a silica sol dispersed in a nitrogen-containing solvent for compatibly mixing silica particles with a polar resin such as a polyimide or polyamide resin. Another object of the present invention is to provide a resin composition containing the silica sol and a resin. When the resin composition is an insulating resin composition, the present invention provides an insulation-coated conductor wire having long insulation life.

Means for Solving the Problems

A first aspect of the present invention is a silica sol comprising silica particles containing aluminum atoms and having an average primary particle diameter of 5 to 100 nm, the silica particles being dispersed in a nitrogen-containing solvent, wherein the aluminum atoms are bonded to the surfaces of the silica particles in an amount in terms of $Al_2O_3$ of 800 to 20,000 ppm/$SiO_2$.

A second aspect of the present invention is the silica sol according to the first aspect, wherein the silica particles are bonded to at least one silane compound selected from the group consisting of silane compounds of the following Formulae (1) to (3) or a hydrolysate of the silane compound:

$$R^1_a Si(R^2)_{4-a} \quad \text{Formula (1)}$$

$$[R^3_b Si(R^4)_{3-b}]_2 Y_c \quad \text{Formula (2)}$$

$$R^5_d S(R^6)_{4-d} \quad \text{Formula (3)}$$

[in Formula (1), $R^1$ is a phenyl group or an organic group containing a phenyl group, an amino group or an organic group containing an amino group, a (meth)acryloyl group or an organic group containing a (meth)acryloyl group, a vinyl group or an organic group containing a vinyl group, a $C_{1-10}$ alkyl group containing a halogen atom if necessary, or any combination of these; $R^2$ is an alkoxy group, an acyloxy group, or a halogen group; and a is an integer of 1 to 3; and in Formulae (2) and (3), $R^3$ and $R^5$ are each a $C_{1-3}$ alkyl group or a $C_{6-30}$ aryl group and bonded to a silicon atom via an Si—C bond; $R^4$ and $R^6$ are each an alkoxy group, an acyloxy group, or a halogen group; Y is an alkylene group, an NH group, or an oxygen atom; b is an integer of 1 to 3; c is an integer of 0 or 1; and d is an integer of 1 to 3].

A third aspect of the present invention is the silica sol according to the second aspect, wherein the silane compound of Formula (1) is bonded to the surfaces of the silica particles such that the amount of the silane compound per unit area of the surfaces of the silica particles is 0.5 to 5.0 molecules/$nm^2$.

A fourth aspect of the present invention is the silica sol according to any one of the first to third aspects, wherein the amount of the aluminum atoms bonded to the surfaces of the silica particles in terms of $Al_2O_3$ is 800 to 20,000 ppm/$SiO_2$ as measured by a leaching process in which the silica particles are leached with an aqueous solution of at least one mineral acid selected from the group consisting of sulfuric acid, nitric acid, and hydrochloric acid.

A fifth aspect of the present invention is the silica sol according to any one of the first to third aspects, wherein the amount of the aluminum atoms bonded to the surfaces of the silica particles in terms of $Al_2O_3$ is 800 to 20,000 ppm/$SiO_2$ as measured by a leaching process in which the silica particles are leached with an aqueous solution of at least one mineral acid selected from the group consisting of sulfuric acid, nitric acid, and hydrochloric acid, and the amount of the aluminum atoms present in the entire silica particles in terms of $Al_2O_3$ is 2,700 to 30,000 ppm/$SiO_2$ as measured by a process in which the silica particles are dissolved in an aqueous hydrofluoric acid solution.

A sixth aspect of the present invention is the silica sol according to any one of the first to fifth aspects, wherein the amount of negative charge present on the surfaces of the silica particles is 0.25 to 0.45 μeq/$m^2$.

A seventh aspect of the present invention is the silica sol according to any one of the first to sixth aspects, wherein the nitrogen-containing solvent is an amide solvent.

An eighth aspect of the present invention is the silica sol according to any one of the first to sixth aspects, wherein the nitrogen-containing solvent is dimethylacetamide, dimethylformamide, N-methylpyrrolidone, or N-ethylpyrrolidone.

A ninth aspect of the present invention is a composition comprising the silica sol according to any one of the first to eighth aspects and a nitrogen-containing polymer.

A tenth aspect of the present invention is an insulating resin composition comprising the silica sol according to any one of the first to eighth aspects and a nitrogen-containing polymer.

An eleventh aspect of the present invention is the composition according to the ninth or tenth aspect, wherein the amount of the nitrogen-containing polymer is 1 to 100 parts by mass relative to 1 part by mass of the silica particles contained in the silica sol.

A twelfth aspect of the present invention is the composition according to any one of the ninth to eleventh aspects, wherein the nitrogen-containing polymer is polyimide, polyamide, polyamic acid, polyamideimide, polyetherimide, or polyesterimide.

A thirteenth aspect of the present invention is the composition according to any one of the ninth to twelfth aspects, wherein the viscosity of the composition after being stored at 50° C. for two weeks is 0.80 to 1.05 times the initial viscosity thereof measured at 25° C.

A fourteenth aspect of the present invention is an insulation-coated conductor wire produced by insulation coating of a conductor wire with the insulating resin composition according to the tenth aspect.

A fifteenth aspect of the present invention is an insulation-coated conductor wire produced by insulation coating of a conductor wire with the insulating resin composition according to the tenth aspect wherein the concentration of the silica particles in the nitrogen-containing solvent is adjusted to 15% by mass, so as to form an insulation coating layer having a thickness of 23 µm, wherein the insulation coating layer of the insulation-coated conductor wire exhibits a flexibility of 1 d to 2d (note: the flexibility is determined by measuring the minimum winding diameter d where no cracks occur in the insulation coating of the 20% elongated insulation-coated conductor wire with respect to the non-elongated insulation-coated conductor wire, and the minimum winding diameter where no cracks occur is measured in a range from its own diameter (1d) to (nd) that is n times the own diameter).

A sixteenth aspect of the present invention is an insulation-coated conductor wire produced by insulation coating of a conductor wire with the insulating resin composition according to the tenth aspect wherein the concentration of the silica particles in the nitrogen-containing solvent is adjusted to 15% by mass, so as to form an insulation coating layer having a thickness of 23 µm, wherein the insulation-coated conductor wire exhibits an insulation life of 0.2 hours to 20 hours as measured at an applied pulse voltage of 1.5 kVp, bipolar, and a 10 kHz rectangular wave (note: the insulation life corresponds to a time until a dielectric breakdown current of 5 mA is detected after application of an increasing voltage of 500 V/s between two wires of the insulation-coated conductor at a temperature of 155° C. while the distance between the two wires is maintained at 50 mm).

A seventeenth aspect of the present invention is a method for producing the silica sol according to any one of the first to eighth aspects, the method comprising the following steps (A) and (B):

step (A): a step of preparing an aqueous silica sol having an average primary particle diameter of 5 to 100 nm, wherein aluminum atoms are bonded to the surfaces of the silica particles in an amount in terms of $Al_2O_3$ of 800 to 20,000 ppm/$SiO_2$, and step (B): a step of replacing the solvent of the silica sol prepared in the step (A) with a nitrogen-containing solvent.

An eighteenth aspect of the present invention is the method for producing the silica sol according to the seventeenth aspect, wherein the aqueous silica sol of the step (A) is prepared by subjecting an aqueous alkali silicate solution containing aluminum atoms or an aqueous alkali silicate solution containing aluminum atoms in the form of an aluminate salt to cation exchange through contact of the aqueous alkali silicate solution with a cation exchange resin, and heating the resultant active silicic acid at 80 to 300° C.

A nineteenth aspect of the present invention is the method for producing the silica sol according to the seventeenth aspect, wherein the aqueous silica sol of the step (A) is prepared by heating an aqueous silica sol containing aluminum atoms in the form of an aluminate salt at 80 to 300° C.

A twentieth aspect of the present invention is the method for producing the silica sol according to any one of the seventeenth to nineteenth aspects, wherein the method comprises, after the step (A), a step (A-1) of reacting the silica sol prepared in the step (A) with the silane compound of Formula (1).

A twenty-first aspect of the present invention is the method for producing the silica sol according to any one of the seventeenth to twentieth aspects, wherein the water contained in the aqueous silica sol prepared in the step (A) or the step (A-1) is replaced with methanol after the step (A) or the step (A-1).

Effects of the Invention

The aluminum atoms in aluminosilicate sites present on the surfaces of aluminum-containing silica particles are four-coordinated, and the aluminum atoms are negatively charged. Thus, a silica sol containing the silica particles exhibits negative zeta potential in all pH ranges, and the absolute value thereof is large. The nitrogen-containing solvent used in the present invention has a carbonyl group and an amino group in the molecule, and exhibits high polarity attributed to a polarized structure or a lone pair of electrons of the nitrogen atom.

It was found that, in the silica sol of the present invention, the polar structure of the nitrogen-containing solvent and the aluminosilicate sites of aluminum bring negative charge to the surfaces of the silica particles, and thus the silica particles can form a dispersion with high dispersibility in the nitrogen-containing solvent.

Such aluminosilicate sites are formed by a method in which an aluminate salt is added to an aqueous alkali silicate solution before formation of silica particles, followed by cation exchange, to thereby yield active silicic acid having aluminate ions, and then the active silicic acid is heated to form aluminosilicate sites in the entire silica particles. The resultant silica particles are used. In another method, an aluminate salt can be added after formation of the silica sol, followed by thermal treatment, to thereby form aluminosilicate sites on the surfaces of the silica particles. The present invention may involve the use of either method of aluminosilicate site formation. The dispersion of the silica particles in a nitrogen-containing solvent having a polar structure requires aluminosilicate sites present on the surfaces of the silica particles. Thus, either of the aforementioned methods may be used, so long as aluminosilicate sites are formed on the surfaces of the silica particles.

Wiring and substrate materials are required to have improved impact resistance and wear resistance in addition to electrical insulation. A polymer containing a carbonyl group and a nitrogen atom (e.g., polyimide, polyamide, polyamideimide, or polyesterimide) is often used as a resin having high electrical insulation.

In the case where nano-level silica particles are compatibly introduced into such a polymer, it is preferred to use a silica sol dispersed in an organic solvent in which the silica particles have high dispersibility in the dispersion medium.

When the dispersion medium of the silica sol dispersed in the organic solvent has a structure in common with the structure of the polymer, the silica sol can be compatibly mixed with the polymer to thereby prepare a varnish. The silica sol can be well mixed with the aforementioned resin by using a nitrogen-containing solvent as the dispersion medium, and a non-turbid silica-dispersed coating composition (varnish) is obtained after the mixing.

When the silica-dispersed coating composition (varnish) is applied to an insulating resin composition for a conductor wire that requires insulation coating, the silica particles contained in the composition may cause a problem in terms of insulation coating due to negative charge on the surfaces of the silica particles. Unexpectedly, it was found that the silica-dispersed coating composition provides very high insulation performance. In the case of application of a conventional varnish with insufficient dispersion of silica particles, the silica aggregates in the coated resin, and an area unprotected against electrical discharge is generated between the localized silica aggregates, whereby dielectric breakdown occurs in the area and the insulation is lost when subjected to electrical discharge. In contrast, in the present invention, the presence of well-dispersed silica particles in the varnish results in a high degree of silica dispersion in the coated resin, and the delocalized silica particles can form a uniform silica layer in the resin. This indicates that the silica particles are sufficiently shielded against electrical discharge, and thus provide high insulation even when subjected to electrical discharge.

The silica sol dispersed in the nitrogen-containing solvent of the present invention is highly compatible with a nitrogen-containing polymer, to thereby form a resin composition containing well dispersed silica particles. When the resultant varnish is applied as an insulating resin composition for coating of a conductor that requires insulation (e.g., a copper wire or an enamel-coated copper wire), an insulation-coated conductor wire is produced.

MODES FOR CARRYING OUT THE INVENTION

Figure 1:
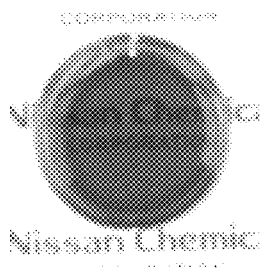
FIG. 1 is a photograph showing the results of a test for evaluation of the transparency of the silica-containing resin varnish of Example 4.

The present invention is directed to a silica sol comprising silica particles containing aluminum atoms and having an average primary particle diameter of 5 to 100 nm, the silica particles being dispersed in a nitrogen-containing solvent, wherein the aluminum atoms are bonded to the surfaces of the silica particles in an amount in terms of $Al_2O_3$ of 800 to 20,000 ppm/$SiO_2$.

The average primary particle diameter of the silica particles of the present invention may be a particle diameter (nm) as measured by the nitrogen gas adsorption method (BET method).

The silica sol of the present invention exhibits good dispersibility in a nitrogen-containing solvent, and has a particle diameter of 5 to 100 nm or 10 to 70 nm as measured by dynamic light scattering (DLS method) in a nitrogen-containing solvent.

The ratio of the particle diameter measured by dynamic light scattering (DLS method)/the particle diameter measured by the nitrogen gas adsorption method (BET method) is 1.10 to 4.50 or 1.20 to 4.00.

In the present invention, the amount of the aluminum atoms in terms of $Al_2O_3$ can be obtained by measuring the amount of aluminum present on the surfaces of the silica particles by a leaching process in which the silica particles are leached with an aqueous solution of at least one mineral acid selected from the group consisting of sulfuric acid, nitric acid, and hydrochloric acid. Specifically, the aluminum atoms are bonded to the surfaces of the silica particles in an amount in terms of $Al_2O_3$ of 800 to 20,000, 800 to 10,000, or 800 to 5,000 ppm/$SiO_2$. The formation of aluminosilicate sites on the silica surfaces is important to disperse the silica particles in a highly polar nitrogen-containing solvent. When the silica particles are leached with an aqueous solution of at least one mineral acid selected from the group consisting of sulfuric acid, nitric acid, and hydrochloric acid, the aluminum (in the form of aluminosilicate) present on the surfaces of the silica particles is leached in a form similar to aluminum salt, aluminum oxide, or aluminum hydroxide. The amount of the aluminum in terms of $Al_2O_3$ can be measured by analyzing the resultant solution with an ICP emission spectrophotometer. In particular, a leaching process using an aqueous nitric acid solution is used. The leaching process may involve the use of an aqueous nitric acid solution having a pH of 0.5 to 4.0, 0.5 to 3.0, 0.5 to 2.0, or 1.0 to 1.5, and typically involves the use of an aqueous nitric acid solution having a pH of 1.0. For example, 100 mL of the aforementioned aqueous nitric acid solution is added to 1 g of the silica, and the mixture is maintained at a temperature of 20 to 70° C. or 40 to 60° C. for 10 to 24 hours, to thereby leach an aluminum compound from the surfaces of the silica particles. The resultant product can be used as a sample for analysis.

In the present invention, the term "the surfaces of silica particles" can be defined as an area wherein an aluminum compound can be leached by the aforementioned leaching process. The amount of aluminum bonded to the surfaces of silica particles ($Al_2O_3/SiO_2$) (ppm) is determined through the following procedure: the solvent is evaporated from the silica sol and then further dried at 250° C.; the resultant silica gel is ground to prepare silica powder; 20 mL of an aqueous nitric acid solution having a pH of 1.0 is added to 0.2 g of the silica powder; the mixture is thoroughly shaken and maintained in a thermostatic chamber at 50° C. for 17 hours; the mixture is subjected to centrifugal filtration, and the aluminum content of the resultant filtrate is measured with an ICP emission spectrophotometer; and the aluminum content in terms of $Al_2O_3$ is divided by the mass of the silica powder.

In the case of formation of aluminosilicate on the surfaces of the silica particles, a production process may form aluminosilicate not only on the silica particle surfaces, but also in the interiors of the silica particles. The amount of aluminum bonded to the silica particles (i.e., aluminum present in the entire silica particles including the surfaces and interiors thereof) in terms of $Al_2O_3$ is 2,700 to 30,000 $ppm/SiO_2$.

The amount of aluminum (in terms of $Al_2O_3$) present in the entire silica particles can be measured by a process in which the silica particles are dissolved in an aqueous hydrofluoric acid solution. Specifically, the amount of aluminum (in terms of $Al_2O_3$) present in the entire silica particles; i.e., the amount of aluminum present in the form of aluminosilicate in the entire silica particles, can be determined through analysis of a solution prepared by dissolving the silica particles in an aqueous hydrofluoric acid solution with an ICP emission spectrophotometer;

Thus, the formation of aluminosilicate sites on the silica particle surfaces provides negative charge on the silica particle surfaces, and the amount of negative charge present on the silica particle surfaces is 0.25 to 0.45 $\mu eq/m^2$.

The nitrogen-containing solvent used in the present invention has at least a functional group containing a nitrogen atom. Examples of the nitrogen atom-containing functional group include an amino group, a nitro group, and a cyano group. The nitrogen-containing solvent is preferably an amide solvent containing a nitrogen-containing functional group and a carbonyl group in one solvent molecule, and having a chain structure or a cyclic structure. The nitrogen atom-containing functional group may be, for example, an amino group, a nitro group, or a cyano group, but is preferably an amino group. The amino group and the carbonyl group may be adjacent to each other, or may be present with the intervention of a carbon atom. For example, the amino group and the carbonyl group may form an amide bond, and an amide solvent is preferably used.

Specific examples of the nitrogen-containing solvent include dimethylformamide, diethylformamide, dimethylacetamide, diethylacetamide, N-methylpyrrolidone, N-ethylpyrrolidone, tetramethylurea, hexamethylphosphoric triamide, dimethylacrylamide, acryloylmorpholine, hydroxyethylacrylamide, isopropylacrylamide, diethylacrylamide, dimethylaminopropylacrylamide, 3-methoxy-N,N-dimethylpropanamide, 3-butoxy-N,N-dimethylpropanamide, dimethylaminopropylacrylamide methyl chloride quaternary salt, and dimethylaminoethylacrylate benzyl chloride quaternary salt.

Preferred examples of the nitrogen-containing solvent include dimethylacetamide, dimethylformamide, N-methylpyrrolidone, and N-ethylpyrrolidone.

In the present invention, the nitrogen-containing solvent may contain an additional solvent, so long as the effects of the invention are not impaired.

Specifically, the entire solvent may contain a nitrogen-containing solvent in an amount of 50 to 100% by volume, 90 to 100% by volume, 98 to 100% by volume, or 99 to 100% by volume, and an additional solvent in an amount of 0 to less than 50% by volume, 0 to less than 10% by volume, 0 to less than 2% by volume, or 0 to less than 1% by volume.

Examples of the additional solvent include water, a ketone solvent, an ester solvent, an alcohol solvent, a glycol ether solvent, a hydrocarbon solvent, a halogen-containing solvent, an ether solvent, a glycol solvent, and an amine solvent.

Examples of the additional solvent include ketone solvents, such as acetone, methyl ethyl ketone, methyl isobutyl ketone, diisobutyl ketone, and cyclohexanone; ester solvents, such as methyl acetate, ethyl acetate, and butyl acetate; alcohol solvents, such as methanol, ethanol, isopropanol, and benzyl alcohol; glycol ether solvents, such as propylene glycol monomethyl ether, ethylene glycol monomethyl ether, ethylene glycol monoethyl ether, ethylene glycol monoethyl ether acetate, ethylene glycol monopropyl ether, and diethylene glycol monobutyl ether; hydrocarbon solvents, such as benzene, toluene, xylene, n-hexane, and cyclohexane; halogen-containing solvents, such as dichloromethane, trichloroethylene, and perchloroethylene; ether solvents, such as dioxane, diethyl ether, and tetrahydrofuran; glycol solvents, such as ethylene glycol, diethylene glycol, propylene glycol, and polyethylene glycol; and amine solvents, such as monoethanolamine, diethanolamine, triethanolamine, monoisopropanolamine, diisopropanolamine, triisopropanolamine, N-methylethanolamine, and 2-amino-2-methyl-1-propanol.

In the present invention, the surfaces of the silica particles may be coated with at least one silane compound selected from the group consisting of silane compounds of Formulae (1) to (3) or a hydrolysate of the silane compound.

In Formula (1), $R^1$ is a phenyl group or an organic group containing a phenyl group, an amino group or an organic group containing an amino group, a (meth)acryloyl group or an organic group containing a (meth)acryloyl group, a vinyl group or an organic group containing a vinyl group, a $C_{1-10}$ alkyl group that may contain a halogen atom, or any combination of these; $R^2$ is an alkoxy group, an acyloxy group, or a halogen group; and a is an integer of 1 to 3.

In Formulae (2) and (3), $R^3$ and $R^5$ are each a $C_1$-3 alkyl group or a $C_6$-30 aryl group and bonded to a silicon atom via an Si—C bond; $R^4$ and $R^6$ are each an alkoxy group, an acyloxy group, or a halogen group; Y is an alkylene group, an NH group, or an oxygen atom; b is an integer of 1 to 3; c is an integer of 0 or 1; and d is an integer of 1 to 3.

In particular, a silane compound of Formula (1) wherein a is 1 or 2 can be used, and a is particularly preferably 1.

The vinyl group or the organic group containing a vinyl group is a $C_{2-10}$ functional group. Examples thereof include ethenyl group, 1-propenyl group, 2-propenyl group, 1-methyl-1-ethenyl group, 1-butenyl group, 2-butenyl group, 3-butenyl group, 2-methyl-1-propenyl group, 2-methyl-2-propenyl group, 1-ethylethenyl group, 1-methyl-1-propenyl group, 1-methyl-2-propenyl group, 1-pentenyl group, 1-hexenyl group, and 1-octynyl group.

The aforementioned alkoxy group is, for example, an alkoxy group having a linear, branched, or cyclic alkyl moiety having a carbon atom number of 1 to 10. Examples thereof include methoxy group, ethoxy group, n-propoxy group, i-propoxy group, n-butoxy group, i-butoxy group, s-butoxy group, and t-butoxy group.

Examples of the $C_{2-10}$ acyloxy group include methylcarbonyloxy group, ethylcarbonyloxy group, n-propylcarbonyloxy group, and i-propylcarbonyloxy group.

Examples of the halogen group include fluorine, chlorine, bromine, and iodine. Fluorine atom is preferably used.

Specific examples of the silane compound of Formula (1) include those described below.

Examples of the silane containing a phenyl group include phenyltrimethoxysilane, phenyltriethoxysilane, dimethoxydiphenylsilane, phenylmethyldimethoxysilane, (2,2-diphenylethyl)trimethoxysilane, and fluorene-based silane coupling agents (e.g., OGSOL SC-001 and SC-003, available from Osaka Gas Chemicals Co., Ltd.).

Examples of the silane containing a phenyl group-containing organic group include p-styryltrimethoxysilane and N-phenyl-3-aminopropyltrimethoxysilane.

Specific examples of the silane compound containing an amino group include aminopropyltrimethoxysilane, aminopropyltriethoxysilane, N-2-(aminoethyl)-3-aminopropylmethyldimethoxysilane, N-2-(aminoethyl)-3-aminopropyltrimethoxysilane, and 3-ureidopropyltrialkoxysilane.

Examples of the silane containing a (meth)acryloyl group or a (meth)acryloyl group-containing organic group include 3-methacryloxypropyltrimethoxysilane, 3-methacryloxypropyltriethoxysilane, 3-methacryloxypropylmethyldimethoxysilane, 3-methacryloxypropylmethyldiethoxysilane, 3-acryloxypropyltrimethoxysilane, 3-acryloxypropyltriethoxysilane, 4-methacryloxybutyltrimethoxysilane, 5-methacryloxypentyltrimethoxysilane, 6-methacryloxyhexyltrimethoxysilane, 7-methacryloxyheptyltrimethoxysilane, and 8-methacryloxyoctyltrimethoxysilane.

Examples of the silane containing a vinyl group or a vinyl group-containing organic group include vinyltrimethoxysilane, vinyltriethoxysilane, 1-butenyltrimethoxysilane, 1-butenyltriethoxysilane, 1-octenyltrimethoxysilane, and 1-octenyltriethoxysilane.

Examples of the silane containing a $C_{1-10}$ alkyl group that may contain a halogen atom include methyltrimethoxysilane, methyltriethoxysilane, n-propyltrimethoxysilane, n-propyltriethoxysilane, hexyltrimethoxysilane, hexyltriethoxysilane, octyltriethoxysilane, decyltrimethoxysilane, 3,3,3-trifluoropropyltrimethoxysilane, and 3,3,3-trifluoropropyltriethoxysilane.

Examples of the combination of functional groups include N-phenyl-3-aminopropyltrimethoxysilane and N-(vinylbenzyl)-2-aminoethyl-3-aminopropyltrimethoxysilane.

The silane compounds of Formulae (2) and (3) are preferably compounds that can form a trimethylsilyl group on the surfaces of the silica particles.

Examples of such compounds include those described below.

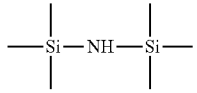

Formula (2-1)

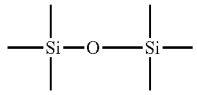

Formula (2-2)

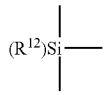

Formula (2-3)

In the aforementioned Formula, $R^{12}$ is an alkoxy group, such as a methoxy group or an ethoxy group.

These silanes may be silane coupling agents available from Shin-Etsu Chemical Co., Ltd.

In the present invention, the surfaces of the silica particles are coated with at least one silane compound selected from the group consisting of silane compounds of Formulae (1) to (3) through the following procedure: a silane compound of any of Formulae (1) to (3) is added to an aqueous silica sol or a methanol silica sol, and the resultant mixture is stirred at a temperature of 10 to 60° C. (typically at room temperature (20° C.)) for 1 to 10 hours. Water is required for hydrolysis of at least one silane compound selected from the group consisting of silane compounds of Formulae (1) to (3). When an aqueous silica sol is used, the aqueous medium can be used as water for the hydrolysis, whereas when a methanol silica sol is used, water present during solvent replacement from the aqueous medium to methanol can be used as water for the hydrolysis.

At least one silane compound selected from the group consisting of silane compounds of Formulae (1) to (3) is bonded to the surfaces of the silica particles such that the amount of the silane compound per unit area of the silica particle surfaces is 0.5 to 5.0 molecules/nm$^2$, 0.5 to 4.0 molecules/nm$^2$, 0.5 to 3.0 molecules/nm$^2$, or 0.5 to 2.0 molecules/nm$^2$.

The silica sol of the present invention can be produced by a method comprising the following steps (A) and (B):

step (A): a step of preparing an aqueous silica sol having an average primary particle diameter of 5 to 100 nm, wherein aluminum atoms are contained on the surfaces of the silica particles in an amount in terms of $Al_2O_3$ of 800 to 20,000 ppm/$SiO_2$, and step (B): a step of replacing the solvent of the silica sol prepared in the step (A) with a nitrogen-containing solvent.

The aqueous silica sol of the step (A) can be prepared by subjecting an aqueous alkali silicate solution containing aluminum atoms or an aqueous alkali silicate solution containing aluminum atoms in the form of an aluminate salt to cation exchange, and heating the resultant active silicic acid at 80 to 300° C. Examples of the aluminate salt include sodium aluminate and potassium aluminate. Examples of the aqueous alkali silicate solution include an aqueous sodium silicate solution and an aqueous potassium silicate solution. The aluminate salt is added in the form of a 0.1 to 30% by mass aqueous solution to the aqueous alkali silicate solution at a temperature of 20 to 100° C., and the resultant solution is stirred for 0.1 to 24 hours. The cation exchange is performed by bringing the aqueous alkali silicate solution into contact with an H type strongly acidic cation exchange resin. If necessary, the aqueous alkali silicate solution may be brought into contact with an anion exchange resin after the cation exchange. The thus-produced active silicic acid containing aluminate ions is heated at 80 to 300° C. for 0.1 to 24 hours, to thereby produce the silica sol of the step (A) wherein aluminosilicate sites are formed on the surfaces of the silica particles and in the interiors thereof.

Alternatively, the aqueous silica sol of the step (A) can be prepared by heating an aqueous silica sol containing aluminum atoms in the form of an aluminate salt at 80 to 300° C. Examples of the aluminate salt include sodium aluminate and potassium aluminate. The aluminate salt is added in the form of a 0.1 to 30% by mass aqueous solution to the silica sol at a temperature of 20 to 100° C., and the resultant mixture is stirred for 0.1 to 24 hours. The thus-produced silica sol containing aluminate ions is heated at 80 to 300° C. for 0.1 to 24 hours, to thereby produce the silica sol of the step (A) wherein aluminosilicate sites are formed on the surfaces of the silica particles and in the interiors thereof.

If necessary, the silica sol prepared in the step (A) may be subjected to cation exchange or anion exchange. The pH of the silica sol may be adjusted to 2 to 5, 2 to 4, or 2 to 3.

In addition, the silica concentration of the silica sol may be adjusted to 5 to 50% by mass or 10 to 30% by mass with an evaporator or an ultrafiltration device.

When the surfaces of the silica particles are coated with a silane compound in the step (A), the silane compound is added after completion of the step (A).

The water of the aqueous silica sol prepared in the step (A) may be replaced with methanol before the step (B) of replacing the solvent of the silica sol of the step (A) with a nitrogen-containing solvent.

In the step (B), the solvent of the silica sol prepared in the step (A) can be replaced with a nitrogen-containing solvent. The solvent replacement is performed by evaporation with an evaporator or by ultrafiltration.

The evaporation with an evaporator is performed at a temperature of 30 to 200° C. and a pressure of 50 to 600 Torr.

In the step (B), a base may be added. The base to be used is an amine, alcoholic sodium hydroxide, or potassium hydroxide. Examples of the amine include alkylamines, such as triethylamine, isopropylamine, diisopropylamine, n-propylamine, di-n-propylamine, isobutylamine, diisobutylamine, n-butylamine, di-n-butylamine, tri-n-butylamine, tri-n-octylamine, N-ethyldiisopropylamine, cyclohexylamine, dicyclohexylamine, N,N-diisopropylethylamine, and tri-n-pentylamine; aralkylamines, such as benzylamine; alicyclic amines, such as piperidine, N-methylpiperidine, and quinuclidine; quaternary ammonium salts, such as tetramethylammonium hydroxide; and cyclic amines, such as imidazole, imidazole derivatives, 1,8-diaza-bicyclo(5,4,0)undec-7-ene, 1,5-diaza-bicyclo(4,3,0)non-5-ene, and 1,4-diaza-bicyclo(2,2,2)octane.

The silica sol dispersed in a nitrogen-containing solvent prepared through the step (B) may be mixed with pure water and methanol so that the proportions by mass of pure water, methanol, and the silica sol are 1:1:1, to thereby adjust the pH of the mixture to 4.0 to 10.0, 4.0 to 9.5, or 4.0 to 9.0.

In the step (B), the entire solvent may contain a nitrogen-containing solvent in an amount of 50 to 100% by volume, 90 to 100% by volume, 98 to 100% by volume, or 99 to 100% by volume, and an additional solvent in an amount of 0 to less than 50% by volume, 0 to less than 10% by volume, 0 to less than 2% by volume, or 0 to less than 1% by volume. The entire solvent may contain, as the additional solvent, water or methanol contained in the silica sol of the step (A) in an amount falling within the aforementioned range, so long as the effects of the present invention are not impaired.

The silica sol dispersed in a nitrogen-containing solvent of the present invention is combined with a nitrogen-containing polymer, to thereby produce a coating composition (resin varnish).

Alternatively, the silica sol dispersed in a nitrogen-containing solvent of the present invention is combined with a nitrogen-containing polymer, to thereby produce an insulating resin composition (resin varnish).

Examples of the combination of the nitrogen-containing polymer with the silane compound used for coating of the silica particles are as follows. For example, a polyamide-imide resin is preferably combined with a silane containing a phenyl group, a silane containing a trifluoroalkyl group, a silane containing an alkyl group, a silane containing an amino group, or a silane containing an organic group composed of any combination of these groups. More specifically, a polyamideimide resin is combined with a sol prepared by dispersing phenyltrimethoxysilane-coated silica particles, 3,3,3-trifluoropropyltrimethoxysilane-coated silica particles, or methyltrimethoxysilane-coated silica particles in DMAC (N,N-dimethylacetamide) solvent, to thereby produce a coating composition or an insulating resin composition.

For example, a polyimide resin is preferably combined with a silane containing a phenyl group, a silane containing an amino group, or a silane containing an organic group composed of a combination of these groups. More specifically, a polyimide resin is combined with a sol prepared by dispersing N-phenyl-3-aminopropyltrimethoxysilane-coated silica particles in DMAC (N,N-dimethylacetamide) solvent, to thereby produce a coating composition or an insulating resin composition.

There can be produced a resin varnish (e.g., the aforementioned coating composition or insulating resin composition) wherein the amount of the nitrogen-containing polymer is 1 to 100 parts by mass relative to 1 part by mass of the silica contained in the silica sol. Examples of the nitrogen-containing polymer include polyimide, polyamide, polyamic acid, polyamideimide, polyetherimide, and polyesterimide.

The resin varnish (e.g., the aforementioned coating composition or insulating resin composition) exhibits high storage stability; i.e., the viscosity of the resin varnish after being stored at 50° C. for two weeks is 0.80 to 1.05 times the initial viscosity thereof measured at 25° C. The viscosity of the resin varnish after storage at 50° C. for two weeks is measured as follows: the resin varnish is removed from a thermostatic storage cabinet at 50° C. and then immediately cooled to 25° C., and the viscosity of the resin varnish is measured at 25° C.

The insulating resin composition can be applied to a conductor that requires insulation, and the composition is thermally cured at a temperature at which the solvent evaporates, to thereby form an insulation coating on the surface of the conductor.

The heating temperature for removal of the solvent depends on pressure. The heating temperature is about 150° C. to 220° C. at ambient pressure.

The aforementioned conductor is a metal wire, in particular, a copper wire. The copper wire is coated with an enamel coating, and used as an electric wire in, for example, motors, transformers, and coils for industrial use and household use.

The insulating resin composition of the present invention can be used for coating of an enamel-coated copper wire to thereby produce an insulation-coated conductor wire. Alternatively, a copper wire can be directly coated with the insulating resin composition instead of enamel for producing an insulation-coated conductor wire.

The aforementioned insulating resin composition is prepared by mixing the silica sol with a nitrogen-containing polymer so that the amount of the polymer is 1 to 100 parts by mass relative to 1 part by mass of the silica contained in the silica sol.

The insulating resin composition is prepared by mixing of the silica sol and the polymer and stirring of the resultant mixture with a mixer or a disper. If desired, an additive may be added to the mixture.

The aforementioned nitrogen-containing polymer is preferably any of polyimide, polyamide, polyamic acid, polyamideimide, polyetherimide, and polyesterimide.

The conductor coated with the insulating resin composition of the present invention exhibits insulation and flexibility.

The flexibility is measured according to JIS C 3216-3 section 5. The present invention provides an insulation-coated conductor wire produced by insulation coating of a conductor wire with the insulating resin composition having a silica concentration adjusted to 15% by mass so as to form an insulation coating layer having a thickness of 23 µm, wherein the insulation coating layer of the insulation-coated conductor wire exhibits a flexibility of 1 d to 2d (note: the flexibility is determined by measuring the minimum winding diameter d where no cracks occur in the insulation coating of the 20% elongated insulation-coated conductor wire with respect to the non-elongated insulation-coated conductor wire, and the minimum winding diameter where no cracks occur is measured in a range from its own diameter (1d) to (nd) that is n times the own diameter).

The insulation is measured according to JIS C 3216-5 section 4. The present invention provides an insulation-coated conductor wire produced by insulation coating of a conductor wire with the insulating resin composition having a silica concentration adjusted to 15% by mass so as to form an insulation coating layer having a thickness of 23 µm, wherein the insulation-coated conductor wire exhibits an insulation life of 0.2 hours to 20 hours or 0.1 to 10 hours as measured at an applied pulse voltage of 1.5 kVp (bipolar, 10 kHz rectangular wave) (note: the insulation life corresponds to a time until a dielectric breakdown current of 5 mA is detected after application of an increasing voltage of 500 V/s between two wires of the insulation-coated conductor at a temperature of 155° C. while the distance between the two wires is maintained at 50 mm).

EXAMPLES (Analytical Method)

[Measurement of $SiO_2$ Concentration]

A silica sol was placed in a crucible, and heated and dried at a temperature 10° C. higher than the boiling point of the dispersion medium, to thereby remove the dispersion medium. Thereafter, the resultant silica gel was baked at 1,000° C., and the baked residue was weighed, to thereby calculate the $SiO_2$ concentration.

[Measurement of Average Primary Particle Diameter (Particle Diameter as Measured by Nitrogen Adsorption Method (BET Method))]

The specific surface area of a powder prepared by drying an acidic silica sol at 300° C. was measured with a specific surface area measuring device (Monosorb MS-16, available from Yuasa Ionics). The average primary particle diameter was calculated by the following formula: average primary particle diameter (nm)=2,720/specific surface area ($m^2/g$).

[Measurement of Water Content]

The water content was determined by Karl Fischer titration.

[Measurement of Viscosity of Silica Sol]

The viscosity was measured with an Ostwald viscometer at 20° C.

[Measurement of Viscosity of Resin Varnish]

The viscosity was measured with a B-type viscometer (B-type Viscometer BMII, available from Toki Sangyo Co., Ltd.) at 25° C.

[Measurement of pH]

The pH was measured with a pH meter (available from DKK-TOA CORPORATION) at 20° C.

In the case of a silica sol dispersed in an organic solvent, pure water, methanol, and the silica sol were mixed in proportions by mass of 1:1:1, and the pH of the resultant mixture was measured.

[Measurement of Particle Diameter by Dynamic Light Scattering]

The particle diameter was measured with a dynamic light scattering particle diameter analyzer (Zetasizer Nano, available from Spectris Co., Ltd.).

[Measurement of Amount of Aluminum Present in Entire Silica Particles]

A silica gel prepared by drying of a silica sol was decomposed with an aqueous hydrofluoric acid solution, and then dissolved in an aqueous nitric acid solution. The aluminum content of the resultant aqueous solution was measured with an ICP emission spectrophotometer, and the aluminum content was divided by the mass of the silica, to thereby determine the amount of aluminum present in the entire silica particles ($Al_2O_3/SiO_2$) (ppm).

[Measurement of Amount of Aluminum Bonded to Silica Surface]

Firstly, 5 g of a silica sol was placed in a crucible, and the silica sol was heated on a hot plate at a temperature 10° C. higher than the boiling point of the solvent, to thereby evaporate the solvent. Subsequently, the silica sol was heated and dried in a dryer at 250° C. for two hours, and then the resultant silica gel was ground with a mortar, to thereby prepare a powder. Thereafter, 0.2 g of the resultant silica powder was added to a polypropylene-made container (PP sampler bottle 20 mL), and 20 mL of an aqueous nitric acid solution having a pH of 1.0 was added to the container, followed by strong manual shaking for 10 minutes. Subsequently, the resultant sample was subjected to an ultrasonic cleaner (AS486, available from AS ONE CORPORATION) for 10 minutes, to thereby thoroughly infiltrate the silica powder with the aqueous nitric acid solution. The resultant mixture was added to a thermostatic chamber at 50° C. and maintained for 17 hours. Thereafter, the mixture was applied to a centrifugal ultrafiltration filter (product name: Amicon Ultra-15, fractionation molecular weight: 10,000) and then subjected to a centrifuge, and the aluminum content of the resultant filtrate was measured with an ICP emission spectrophotometer. The thus-measured aluminum content was divided by the mass of the silica powder, to thereby determine the amount of aluminum present on the silica surface ($Al_2O_3/SiO_2$) (ppm).

[Measurement of Amount of Negative Charge on Silica Particle Surface]

Firstly, 100 g of an acidic silica sol having a silica concentration adjusted to 0.5% by mass was provided, and an aqueous ammonia solution was added to the silica sol, to thereby prepare an aqueous solution for measurement having a pH of 5.0 at 20° C.

Subsequently, 20 g of the prepared aqueous solution for measurement was fractionated and subjected to a streaming potential measuring device (Stabino PMX400, available from MicrotracBEL). N/400 DADMAC solution (available from Wako Pure Chemical Industries, Ltd.) was used as a cationic standard titrant to measure a cationic streaming potential titer. The resultant streaming potential titer was defined as a surface negative charge amount. The value obtained through the aforementioned measurement corresponds to the surface negative charge amount per g of the silica particles (µeq/g). The value was divided by the specific surface area ($m^2/g$) of the silica particles, and the resultant value was defined as the amount of negative charge present per unit specific surface area of the silica particle surfaces.

Synthesis Example 1/Synthesis of Acidic Silica Sol
(1)

A silica sol dispersed in water (1) was provided (average primary particle diameter: 11 nm, pH 9, silica concentration:

20% by mass, $Al_2O_3$ concentration: 0.17% by weight, available from Nissan Chemical Corporation).

A SUS autoclave reactor (inner volume: 3 L) was charged with 2,500 g of the silica sol dispersed in water (1), which was produced from an aqueous alkali silicate solution containing aluminum atoms, and the silica sol was subjected to hydrothermal treatment at 150° C. for 5.0 hours. Subsequently, 2,000 g of the resultant sol was caused to pass through a column of about 25° C. charged with 200 mL of a hydrogen type strongly acidic cation exchange resin Amberlite IR-120B at a space velocity of 5 per hour, to thereby yield 2,000 g of an acidic silica sol (1) (pH 2.5, $SiO_2$ concentration: 20% by mass, amount of aluminum bonded to the silica particle surfaces ($Al_2O_3/SiO_2$): 4,500 ppm, amount of aluminum present in the entire silica particles ($Al_2O_3/SiO_2$): 5,915 ppm, average primary particle diameter: 11 nm, amount of negative charge: 0.43 μeq/m$^2$).

Synthesis Example 2/Synthesis of Acidic Silica Sol (2)

A SUS autoclave reactor (inner volume: 3 L) was charged with 2,500 g of the silica sol dispersed in water (1), which was produced from an aqueous alkali silicate solution containing aluminum atoms, and the silica sol was subjected to hydrothermal treatment at 245° C. for 2.5 hours. Subsequently, 2,000 g of the resultant sol was caused to pass through a column of about 25° C. charged with 200 mL of a hydrogen type strongly acidic cation exchange resin Amberlite IR-120B at a space velocity of 5 per hour, to thereby yield 2,000 g of an acidic silica sol (2) (pH 2.9, $SiO_2$ concentration: 20% by mass, amount of aluminum bonded to the silica particle surfaces ($Al_2O_3/SiO_2$): 3,200 ppm, amount of aluminum present in the entire silica particles ($Al_2O_3/SiO_2$): 7,534 ppm, average primary particle diameter: 21 nm, amount of negative charge: 0.40 μeq/m$^2$).

Synthesis Example 3/Synthesis of Acidic Silica Sol (3)

The process was performed in the same manner as in Synthesis Example 1, except that the heating temperature in the autoclave was changed from 150° C. to 110° C., to thereby yield an acidic silica sol (3) (pH 2.6, $SiO_2$ concentration: 20% by mass, amount of aluminum bonded to the silica particle surfaces ($Al_2O_3/SiO_2$): 4,000 ppm, amount of aluminum present in the entire silica particles ($Al_2O_3/SiO_2$): 5,400 ppm, average primary particle diameter: 11 nm, amount of negative charge: 0.39 μeq/m$^2$).

Synthesis Example 4/Synthesis of Acidic Silica Sol (4)

A silica sol dispersed in water (2) was provided (average primary particle diameter: 9.5 nm, pH 3, silica concentration: 18% by mass, $Al_2O_3$ concentration: 0.5% by weight, available from Nissan Chemical Corporation).

A SUS autoclave reactor (inner volume: 3 L) was charged with 2,500 g of the silica sol dispersed in water (2), which was produced from an aqueous alkali silicate solution containing aluminum atoms, and the silica sol was subjected to hydrothermal treatment at 130° C. for 5.0 hours. Subsequently, 2,000 g of the resultant sol was caused to pass through a column of about 25° C. charged with 200 mL of a hydrogen type strongly acidic cation exchange resin Amberlite IR-120B at a space velocity of 5 per hour, to thereby yield 2,000 g of an acidic silica sol (4) (pH 2.6, $SiO_2$ concentration: 18% by mass, amount of aluminum bonded to the silica particle surfaces ($Al_2O_3/SiO_2$): 4,000 ppm, amount of aluminum present in the entire silica particles ($Al_2O_3/SiO_2$): 5,454 ppm, average primary particle diameter: 9.5 nm, amount of negative charge: 0.41 μeq/m$^2$).

Synthesis Example 5/Synthesis of Acidic Silica Sol (5)

A silica sol dispersed in water (3) was provided (average primary particle diameter: 4 nm, pH 10, silica concentration: 15% by mass, $Al_2O_3$ concentration: 0.43% by weight, available from Nissan Chemical Corporation).

A SUS autoclave reactor (inner volume: 3 L) was charged with 2,500 g of the silica sol dispersed in water (3), which was produced from an aqueous alkali silicate solution containing aluminum atoms, and the silica sol was subjected to hydrothermal treatment at 120° C. for 5.0 hours. Subsequently, 2,000 g of the resultant sol was caused to pass through a column of about 25° C. charged with 200 mL of a hydrogen type strongly acidic cation exchange resin Amberlite IR-120B at a space velocity of 5 per hour, to thereby yield 2,000 g of an acidic silica sol (5) (pH 2.7, $SiO_2$ concentration: 14% by mass, amount of aluminum bonded to the silica particle surfaces ($Al_2O_3/SiO_2$): 17,000 ppm, amount of aluminum present in the entire silica particles ($Al_2O_3/SiO_2$): 22,857 ppm, average primary particle diameter: 5 nm, amount of negative charge: 0.29 μeq/m$^2$).

Comparative Synthesis Example 1/Provision of Acidic Silica Sol (6)

An acidic silica sol (6) was provided (pH 2.6, $SiO_2$ concentration: 20% by mass, amount of aluminum bonded to the silica particle surfaces ($Al_2O_3/SiO_2$): 760 ppm, amount of aluminum present in the entire silica particles ($Al_2O_3/SiO_2$): 2,300 ppm, average primary particle diameter: 11 nm, amount of negative charge: 0.30 μeq/m$^2$, available from Nissan Chemical Corporation). This silica sol was produced from an aqueous alkali silicate solution containing aluminum atoms.

Comparative Synthesis Example 2/Provision of Acidic Silica Sol (7)

An acidic silica sol (7) was provided (pH 3, $SiO_2$ concentration: 20% by mass, amount of aluminum bonded to the silica particle surfaces ($Al_2O_3/SiO_2$): 450 ppm, amount of aluminum present in the entire silica particles ($Al_2O_3/SiO_2$): 2,570 ppm, average primary particle diameter: 21 nm, amount of negative charge: 0.35 μeq/m$^2$, available from Nissan Chemical Corporation). This silica sol was produced from an aqueous alkali silicate solution containing aluminum atoms.

Comparative Synthesis Example 3/Provision of Acidic Silica Sol (8)

An acidic silica sol (8) was provided (pH 3, $SiO_2$ concentration: 20% by mass, amount of aluminum bonded to the silica particle surfaces ($Al_2O_3/SiO_2$): 460 ppm, amount of aluminum present in the entire silica particles ($Al_2O_3/SiO_2$): 2,500 ppm, average primary particle diameter: 45 nm, amount of negative charge: 0.31 μeq/m$^2$, available from Nissan Chemical Corporation). This silica sol was produced from an aqueous alkali silicate solution containing aluminum atoms.

Comparative Synthesis Example 4/Provision of Acidic Silica Sol (9)

A silica sol dispersed in water (4) was provided (average primary particle diameter: 4 nm, pH 12, silica concentration: 7% by mass, $Al_2O_3$ concentration: 0.7% by weight, available from Nissan Chemical Corporation). A SUS autoclave reactor (inner volume: 3 L) was charged with 2,500 g of the silica sol dispersed in water (4), which was produced from an aqueous alkali silicate solution containing aluminum atoms, and the silica sol was subjected to hydrothermal treatment at 110° C. for 5.0 hours. As a result, gelation occurred, and an acidic gel failed to be produced.

Example 1

A 2 L eggplant-shaped flask was charged with 1,000 g of the acidic silica sol (1). While the sol was stirred with a magnetic stirrer, 1.6 g of N,N-diisopropylethylamine and 400 g of N,N-dimethylacetamide (hereinafter abbreviated as "DMAC") were added to and mixed with the sol for 15 minutes. While 200 g of DMAC was fed, water was distilled off with a rotary evaporator at reduced pressure (pressure: 170 Torr, bath temperature: 105° C.), to thereby yield 1,000 g of a silica sol dispersed in a mixed solvent of DMAC and water (silica concentration: 20% by weight, water content: 20% by mass). While the resultant silica sol was stirred with a magnetic stirrer, 16.3 g of phenyltrimethoxysilane (trade name: KBM-103, available from Shin-Etsu Chemical Co., Ltd.) was added, and then the liquid temperature was maintained at 60° C. for one hour. Subsequently, 0.8 g of N,N-diisopropylethylamine was added, and the resultant mixture was maintained at 60° C. for one hour. Thereafter, while 400 g of DMAC was fed, water was distilled off with a rotary evaporator at reduced pressure (pressure: 170 to 90 Torr, bath temperature: 105 to 125° C.), to thereby yield a silica sol dispersed in DMAC (silica concentration: 30.5% by mass, pH 4.7, viscosity (20° C.): 4.8 mPa·s, water content: 0.1% by mass, particle diameter as measured by dynamic light scattering: 24 nm, average primary particle diameter: 11 nm, amount of the bonded silane compound per unit area of the silica particle surfaces: 1.0 molecule/$nm^2$, amount of aluminum bonded to the silica particle surfaces ($Al_2O_3/SiO_2$): 2,915 ppm, amount of aluminum present in the entire silica particles ($Al_2O_3/SiO_2$): 5,797 ppm).

The silica sol dispersed in DMAC prepared in Example 1 was added to and mixed with a polyamideimide insulating resin varnish (trade name: HPC-5012-32, available from Showa Denko Materials Co., Ltd., resin solid content: 32% by mass, NMP (N-methyl-2-pyrrolidone) solvent) in a glass bottle so that the ratio of the resin/$SiO_2$ was 85/15. The glass bottle was strongly manually shaken about 10 times, and then the mixture was stirred with a mix rotor (trade name: MR-5, available from AS ONE CORPORATION) at 23° C. for 12 hours, to thereby yield a silica-containing polyamideimide resin varnish (resin/$SiO_2$=85/15).

After storage at 50° C. for four weeks, the resultant varnish exhibited a transparent appearance similar to the original polyamideimide resin varnish. The varnish exhibited an initial viscosity of 2,600 cps. The viscosity of the varnish was 2,620 cps after storage at 50° C. for two weeks, and the viscosity of the varnish was 2,630 cps after storage at 50° C. for four weeks.

Example 2

To 670 g of the silica sol dispersed in DMAC prepared by the method described in Example 1 was added 8.4 g of 2% NaOH methanol solution (containing water in an amount of 18% by mass), to thereby yield a silica sol dispersed in DMAC (silica concentration: 30.1% by mass, pH 8.5, viscosity (20° C.): 5.6 mPa·s, water content: 0.3% by mass, particle diameter as measured by dynamic light scattering: 28 nm, average primary particle diameter: 11 nm, amount of the bonded silane compound per unit area of the silica particle surfaces: 1.0 molecule/$nm^2$, amount of aluminum bonded to the silica particle surfaces ($Al_2O_3/SiO_2$): 2,915 ppm, amount of aluminum present in the entire silica particles ($Al_2O_3/SiO_2$): 5,797 ppm).

The resultant silica sol was used, and a silica-containing polyamideimide resin varnish (resin/$SiO_2$=85/15) was prepared in the same manner as in Example 1. After storage at 50° C. for four weeks, the resultant varnish exhibited a transparent appearance similar to the original polyamideimide resin varnish. The varnish exhibited an initial viscosity of 2,640 cps. The viscosity of the varnish was 2,400 cps after storage at 50° C. for two weeks, and the viscosity of the varnish was 2,200 cps after storage at 50° C. for four weeks.

Example 3

To 667 g of the silica sol dispersed in DMAC prepared by the method described in Example 1 was added 1.2 g of tri-n-pentylamine, to thereby yield a silica sol dispersed in DMAC (silica concentration: 30.5% by mass, pH 8.5, viscosity (20° C.): 5.5 mPa·s, water content: 0.1% by mass, particle diameter as measured by dynamic light scattering: 27 nm, average primary particle diameter: 11 nm, amount of the bonded silane compound per unit area of the silica particle surfaces: 1.0 molecule/$nm^2$, amount of aluminum bonded to the silica particle surfaces ($Al_2O_3/SiO_2$): 2,915 ppm, amount of aluminum present in the entire silica particles ($Al_2O_3/SiO_2$): 5,797 ppm).

The resultant silica sol was used, and a silica-containing polyamideimide resin varnish (resin/$SiO_2$=85/15) was prepared in the same manner as in Example 1. After storage at 50° C. for two weeks, the resultant varnish exhibited a transparent appearance similar to the original polyamideimide resin varnish. The varnish exhibited an initial viscosity of 2,700 cps. The viscosity of the varnish was 2,500 cps after storage at 50° C. for two weeks, and the viscosity of the varnish was 2,400 cps after storage at 50° C. for four weeks.

Example 4

A glass-made reactor (inner volume: 2 L) equipped with a stirrer, a condenser, a thermometer, and two inlet ports was charged with 1,000 g of the acidic silica sol (1) prepared in Example 1. While the sol was boiled in the reactor, methanol vapor generated in another boiler was continuously blown into the silica sol in the reactor, to thereby replace water with methanol while the liquid level was gradually increased. The replacement was terminated at the time when the volume of the distillate reached 9 L, to thereby yield 1,100 g of a silica sol dispersed in methanol ($SiO_2$ concentration: 20.5% by mass, water content: 1.6% by mass, viscosity: 2 mPa·s).

A 2 L eggplant-shaped flask was charged with 1,000 g of the resultant methanol sol. While the sol was stirred with a magnetic stirrer, 21.2 g of phenyltrimethoxysilane was added, and then the liquid temperature was maintained at 60° C. for one hour. Subsequently, 1.6 g of N,N-diisopropylethylamine was added, and the liquid temperature was maintained at 60° C. for one hour. Thereafter, 19.6 g of phenyltrimethoxysilane and 150 g of methyl ethyl ketone were added, and the liquid temperature was maintained at 60° C. for five hours. Subsequently, while the solvent was distilled off with a rotary evaporator at a reduced pressure of 450 to 110 Torr and a bath temperature of 85 to 125° C., DMAC was fed, and the dispersion medium of the sol was replaced with DMAC, to thereby yield a silica sol dispersed in DMAC (silica concentration: 30.5% by mass, pH 4.6, viscosity (20° C.): 5 mPa·s, water content: 0.1% by mass, particle diameter as measured by dynamic light scattering: 18 nm, average primary particle diameter: 11 nm, amount of the bonded silane compound per unit area of the silica particle surfaces: 2.5 molecules/nm$^2$, amount of aluminum bonded to the silica particle surfaces ($Al_2O_3/SiO_2$): 2,330 ppm, amount of aluminum present in the entire silica particles ($Al_2O_3/SiO_2$): 5,619 ppm).

The resultant sol was used, and a silica-containing polyamideimide resin varnish (resin/$SiO_2$=85/15) was prepared in the same manner as in Example 1. After storage at 50° C. for four weeks, the resultant varnish exhibited a transparent appearance similar to the original polyamideimide resin varnish. The varnish exhibited an initial viscosity of 2,400 cps. The viscosity of the varnish was 2,420 cps after storage at 50° C. for two weeks, and the viscosity of the varnish was 2,400 cps after storage at 50° C. for four weeks.

Example 5

The process was performed in the same manner as in Example 1, except that 16.3 g of phenyltrimethoxysilane was replaced with 17.9 g of 3,3,3-trifluoropropyltrimethoxysilane (trade name: KBM-7103, available from Shin-Etsu Chemical Co., Ltd.), to thereby yield a silica sol dispersed in DMAC (silica concentration: 30.5% by mass, pH 4.6, viscosity (20° C.): 6.6 mPa·s, water content: 0.1% by mass, particle diameter as measured by dynamic light scattering: 28 nm, average primary particle diameter: 11 nm, amount of the bonded silane compound per unit area of the silica particle surfaces: 1.0 molecule/nm$^2$, amount of aluminum bonded to the silica particle surfaces ($Al_2O_3/SiO_2$): 3,050 ppm, amount of aluminum present in the entire silica particles ($Al_2O_3/SiO_2$): 5,797 ppm).

The resultant sol was used, and a silica-containing polyamideimide resin varnish (resin/$SiO_2$=85/15) was prepared in the same manner as in Example 1. After storage at 50° C. for four weeks, the resultant varnish exhibited a transparent appearance similar to the original polyamideimide resin varnish. The varnish exhibited an initial viscosity of 2,260 cps. The viscosity of the varnish was 2,000 cps after storage at 50° C. for two weeks, and the viscosity of the varnish was 1,860 cps after storage at 50° C. for four weeks.

Example 6

The process was performed in the same manner as in Example 1, except that 16.3 g of phenyltrimethoxysilane was replaced with 11.2 g of methyltrimethoxysilane (trade name: KBM-13, available from Shin-Etsu Chemical Co., Ltd.), to thereby yield a silica sol dispersed in DMAC (silica concentration: 30.5% by mass, pH 4.8, viscosity (20° C.): 4.8 mPa·s, water content: 0.1% by mass, particle diameter as measured by dynamic light scattering: 28 nm, average primary particle diameter: 11 nm, amount of the bonded silane compound per unit area of the silica particle surfaces: 1.0 molecule/nm$^2$, amount of aluminum bonded to the silica particle surfaces ($Al_2O_3/SiO_2$): 3,240 ppm, amount of aluminum present in the entire silica particles ($Al_2O_3/SiO_2$): 5,797 ppm).

The resultant sol was used, and a silica-containing polyamideimide resin varnish (resin/$SiO_2$=85/15) was prepared in the same manner as in Example 1. After storage at 50° C. for four weeks, the resultant varnish exhibited a transparent appearance similar to the original polyamideimide resin varnish. The varnish exhibited an initial viscosity of 2,570 cps. The viscosity of the varnish was 2,520 cps after storage at 50° C. for two weeks, and the viscosity of the varnish was 2,480 cps after storage at 50° C. for four weeks.

Example 7

The process was performed in the same manner as in Example 1, except that phenyltrimethoxysilane was not added, to thereby yield a silica sol dispersed in DMAC (silica concentration: 20.5% by mass, pH 4.5, water content: 0.1% by mass, particle diameter as measured by dynamic light scattering: 40 nm, average primary particle diameter: 11 nm, amount of aluminum bonded to the silica particle surfaces ($Al_2O_3/SiO_2$): 4,490 ppm, amount of aluminum present in the entire silica particles ($Al_2O_3/SiO_2$): 5,915 ppm).

The resultant sol was used, and a silica-containing polyamideimide resin varnish (resin/$SiO_2$=85/15) was prepared in the same manner as in Example 1. After storage at 50° C. for four weeks, the resultant varnish exhibited a transparent appearance similar to the original polyamideimide resin varnish. The varnish exhibited an initial viscosity of 1,600 cps. The viscosity of the varnish was 1,560 cps after storage at 50° C. for two weeks, and the viscosity of the varnish was 1,480 cps after storage at 50° C. for four weeks.

Example 8

A glass-made reactor (inner volume: 2 L) equipped with a stirrer, a condenser, a thermometer, and two inlet ports was charged with 1,000 g of the acidic silica sol (2). While the sol was boiled in the reactor, methanol vapor generated in another boiler was continuously blown into the silica sol in the reactor, to thereby replace water with methanol while the liquid level was gradually increased. The replacement was terminated at the time when the volume of the distillate reached 9 L, to thereby yield 1,100 g of a silica sol dispersed in methanol. The resultant silica sol dispersed in methanol had an $SiO_2$ concentration of 20% by mass, a water content of 1.0% by mass, and a viscosity of 2 mPa·s.

A 2 L eggplant-shaped flask was charged with 1,000 g of the resultant methanol sol. While the sol was stirred with a magnetic stirrer, 11.7 g of phenyltrimethoxysilane was added, and then the liquid temperature was maintained at 60° C. for one hour. Subsequently, 1.6 g of N,N-diisopropylethylamine was added, and the liquid temperature was maintained at 60° C. for one hour. Thereafter, 10.8 g of phenyltrimethoxysilane and 150 g of methyl ethyl ketone were added, and the liquid temperature was maintained at 60° C. for five hours. Subsequently, while the solvent was distilled off with a rotary evaporator at a reduced pressure of 450 to 110 Torr and a bath temperature of 85 to 125° C., DMAC was fed, and the dispersion medium of the sol was replaced with DMAC, to thereby yield a silica sol dispersed in DMAC (silica concentration: 30.5% by mass, pH 4.9, viscosity (20° C.): 7.4 mPa·s, water content: 0.1% by mass, particle diameter as measured by dynamic light scattering: 39 nm, average primary particle diameter: 21 nm, amount of the bonded silane compound per unit area of the silica particle surfaces: 2.5 molecules/nm$^2$, amount of aluminum bonded to the silica particle surfaces ($Al_2O_3/SiO_2$): 3,054 ppm, amount of aluminum present in the entire silica particles ($Al_2O_3/SiO_2$): 7,308 ppm).

The resultant sol was used, and a silica-containing polyamideimide resin varnish (resin/$SiO_2$=85/15) was prepared in the same manner as in Example 1. After storage at 50° C. for four weeks, the resultant varnish exhibited a transparent appearance similar to the original polyamideimide resin varnish. The varnish exhibited an initial viscosity of 2,400 cps. The viscosity of the varnish was 2,220 cps after storage at 50° C. for two weeks, and the viscosity of the varnish was 2,300 cps after storage at 50° C. for four weeks.

Example 9

A 2 L eggplant-shaped flask was charged with 1,000 g of the acidic silica sol (2). While the sol was stirred with a magnetic stirrer, 1.6 g of N,N-diisopropylethylamine and 400 g of DMAC were added, and the mixture was stirred for 15 minutes. While 200 g of DMAC was fed, water was distilled off with a rotary evaporator at a reduced pressure (pressure: 170 Torr, bath temperature: 105° C.), to thereby yield 1,000 g of a silica sol dispersed in a mixed solvent of DMAC and water (silica concentration: 20% by weight, water content: 20% by mass). While the resultant sol was stirred with a magnetic stirrer, 9.0 g of phenyltrimethoxysilane (trade name: KBM-103, available from Shin-Etsu Chemical Co., Ltd.) was added, and then the liquid temperature was maintained at 60° C. for one hour. Subsequently, 0.8 g of N,N-diisopropylethylamine was added, and the resultant mixture was maintained at 60° C. for one hour. Thereafter, while DMAC was fed, water was distilled off with a rotary evaporator at a reduced pressure (pressure: 170 to 90 Torr, bath temperature: 105 to 125° C.), to thereby yield a silica sol dispersed in DMAC (silica concentration: 30.5% by mass, viscosity (20° C.): 13.4 mPa·s, water content: 0.2% by mass). Subsequently, 1.0 g of tri-n-pentylamine was added to 670 g of the resultant silica sol dispersed in DMAC, to thereby yield a silica sol dispersed in DMAC (silica concentration: 30.5% by mass, pH 8.6, viscosity (20° C.): 13.4 mPa·s, water content: 0.2% by mass, particle diameter as measured by dynamic light scattering: 42 nm, average primary particle diameter: 21 nm, amount of the bonded silane compound per unit area of the silica particle surfaces: 1.0 molecule/$nm^2$, amount of aluminum bonded to the silica particle surfaces ($Al_2O_3/SiO_2$): 2,444 ppm, amount of aluminum present in the entire silica particles ($Al_2O_3/SiO_2$): 7,383 ppm).

The resultant sol was used, and a silica-containing polyamideimide resin varnish (resin/$SiO_2$=85/15) was prepared in the same manner as in Example 1. After storage at 50° C. for four weeks, the resultant varnish exhibited a transparent appearance similar to the original polyamideimide resin varnish. The varnish exhibited an initial viscosity of 2,600 cps. The viscosity of the varnish was 2,360 cps after storage at 50° C. for two weeks, and the viscosity of the varnish was 2,160 cps after storage at 50° C. for four weeks.

Example 10

The process was performed in the same manner as in Example 9, except that phenyltrimethoxysilane was not added, to thereby yield a silica sol dispersed in DMAC (silica concentration: 20.5% by mass, pH 4.5, particle diameter as measured by dynamic light scattering: 43.0 nm, average primary particle diameter: 21 nm, amount of aluminum bonded to the silica particle surfaces ($Al_2O_3/SiO_2$): 3,130 ppm, amount of aluminum present in the entire silica particles ($Al_2O_3/SiO_2$): 7,534 ppm).

The resultant sol was used, and a silica-containing polyamideimide resin varnish (resin/$SiO_2$=85/15) was prepared in the same manner as in Example 1. After storage at 50° C. for four weeks, the resultant varnish exhibited a transparent appearance similar to the original polyamideimide resin varnish. The varnish exhibited an initial viscosity of 1,440 cps. The viscosity of the varnish was 1,380 cps after storage at 50° C. for two weeks, and the viscosity of the varnish was 1,440 cps after storage at 50° C. for four weeks.

Example 11

The acidic silica sol (3) was used, and the reaction and the solvent replacement were performed in the same manner as in Example 1, to thereby yield a silica sol dispersed in DMAC (silica concentration: 30.5% by mass, pH 4.4, viscosity (20° C.): 4.8 mPa·s, water content: 0.1% by mass, particle diameter as measured by dynamic light scattering: 24 nm, average primary particle diameter: 11 nm, amount of the bonded silane compound per unit area of the silica particle surfaces: 1.0 molecule/$nm^2$, amount of aluminum bonded to the silica particle surfaces ($Al_2O_3/SiO_2$): 2,663 ppm, amount of aluminum present in the entire silica particles ($Al_2O_3/SiO_2$): 5,297 ppm).

The resultant sol was used, and a silica-containing polyamideimide resin varnish (resin/$SiO_2$=85/15) was prepared in the same manner as in Example 1. After storage at 50° C. for four weeks, the resultant varnish exhibited a transparent appearance similar to the original polyamideimide resin varnish. The varnish exhibited an initial viscosity of 2,600 cps. The viscosity of the varnish was 2,550 cps after storage at 50° C. for two weeks, and the viscosity of the varnish was 2,500 cps after storage at 50° C. for four weeks.

Example 12

The reaction and the solvent replacement were performed in the same manner as in Example 4, except that 19.6 g of phenyltrimethoxysilane was replaced with 25.2 g of N-phenyl-3-aminopropyltrimethoxysilane, to thereby yield a silica sol dispersed in DMAC (silica concentration: 30.5% by mass, pH 4.7, viscosity (20° C.): 5 mPa·s, water content: 0.1% by mass, particle diameter as measured by dynamic light scattering: 20 nm, average primary particle diameter: 11 nm, amount of the bonded silane compound per unit area of the silica particle surfaces: 2.5 molecules/$nm^2$, amount of aluminum bonded to the silica particle surfaces ($Al_2O_3/SiO_2$): 2,780 ppm, amount of aluminum present in the entire silica particles ($Al_2O_3/SiO_2$): 5,560 ppm).

The resultant sol was used, and a silica-containing polyamideimide resin varnish (resin/$SiO_2$=85/15) was prepared in the same manner as in Example 1. After storage at 50° C. for four weeks, the resultant varnish exhibited a transparent appearance similar to the original polyamideimide resin varnish. The varnish exhibited an initial viscosity of 2,450 cps. The viscosity of the varnish was 2,470 cps after storage at 50° C. for two weeks, and the viscosity of the varnish was 2,490 cps after storage at 50° C. for four weeks.

Example 13

A glass-made reactor (inner volume: 2 L) equipped with a stirrer, a condenser, a thermometer, and two inlet ports was charged with 1,000 g of the acidic silica sol (4). While the sol was boiled in the reactor, methanol vapor generated in another boiler was continuously blown into the silica sol in the reactor, to thereby replace water with methanol while the liquid level was gradually increased. The replacement was terminated at the time when the volume of the distillate reached 9 L, to thereby yield 1,100 g of a silica sol dispersed in methanol. The resultant silica sol dispersed in methanol had an $SiO_2$ concentration of 20% by mass, a water content of 1.0% by mass, and a viscosity of 2 mPa·s.

A 2 L eggplant-shaped flask was charged with 1,000 g of the resultant methanol sol. While the sol was stirred with a magnetic stirrer, 24.6 g of phenyltrimethoxysilane was added, and then the liquid temperature was maintained at 60° C. for one hour. Subsequently, 1.8 g of N,N-diisopropylethylamine was added, and the liquid temperature was maintained at 60° C. for one hour. Thereafter, 22.7 g of phenyltrimethoxysilane and 150 g of methyl ethyl ketone were added, and the liquid temperature was maintained at 60° C. for five hours. Subsequently, while the solvent was distilled off with a rotary evaporator at a reduced pressure of 450 to 110 Torr and a bath temperature of 85 to 125° C., DMAC was fed, and the dispersion medium of the sol was replaced with DMAC, to thereby yield a silica sol dispersed in DMAC (silica concentration: 30.7% by mass, pH 4.4, viscosity (20° C.): 7.8 mPa·s, water content: 0.1% by mass, particle diameter as measured by dynamic light scattering: 20 nm, average primary particle diameter: 9.5 nm, amount of the bonded silane compound per unit area of the silica particle surfaces: 2.5 molecules/nm², amount of aluminum bonded to the silica particle surfaces ($Al_2O_3/SiO_2$): 2,230 ppm, amount of aluminum present in the entire silica particles ($Al_2O_3/SiO_2$): 5,072 ppm).

The resultant sol was used, and a silica-containing polyamideimide resin varnish (resin/$SiO_2$=85/15) was prepared in the same manner as in Example 1. After storage at 50° C. for four weeks, the resultant varnish exhibited a transparent appearance similar to the original polyamideimide resin varnish. The varnish exhibited an initial viscosity of 2,200 cps. The viscosity of the varnish was 2,400 cps after storage at 50° C. for two weeks, and the viscosity of the varnish was 2,200 cps after storage at 50° C. for four weeks.

Example 14

A glass-made reactor (inner volume: 2 L) equipped with a stirrer, a condenser, a thermometer, and two inlet ports was charged with 500 g of the acidic silica sol (5) and 500 g of pure water. While the sol was boiled in the reactor, methanol vapor generated in another boiler was continuously blown into the silica sol in the reactor, to thereby replace water with methanol while the liquid level was gradually increased. The replacement was terminated at the time when the volume of the distillate reached 9 L, to thereby yield 1,100 g of a silica sol dispersed in methanol. The resultant silica sol dispersed in methanol had an $SiO_2$ concentration of 12% by mass and a water content of 1.0% by mass.

A 2 L eggplant-shaped flask was charged with 1,000 g of the resultant methanol sol. While the sol was stirred with a magnetic stirrer, 23.1 g of phenyltrimethoxysilane was added, and then the liquid temperature was maintained at 60° C. for one hour. Subsequently, 0.8 g of N,N-diisopropylethylamine was added, and the liquid temperature was maintained at 60° C. for one hour. Thereafter, 21.0 g of phenyltrimethoxysilane and 150 g of methyl ethyl ketone were added, and the liquid temperature was maintained at 60° C. for five hours. Subsequently, while the solvent was distilled off with a rotary evaporator at a reduced pressure of 450 to 110 Torr and a bath temperature of 85 to 125° C., DMAC was fed, and the dispersion medium of the sol was replaced with DMAC, to thereby yield a silica sol dispersed in DMAC (silica concentration: 20.8% by mass, pH 3.6, viscosity (20° C.): 46 mPa·s, water content: 0.1% by mass, particle diameter as measured by dynamic light scattering: 60 nm, average primary particle diameter: 5.3 nm, amount of the bonded silane compound per unit area of the silica particle surfaces: 2.5 molecules/nm², amount of aluminum bonded to the silica particle surfaces ($Al_2O_3/SiO_2$): 7,286 ppm, amount of aluminum present in the entire silica particles ($Al_2O_3/SiO_2$): 21,028 ppm).

The resultant sol was used, and a silica-containing polyamideimide resin varnish (resin/$SiO_2$=85/15) was prepared in the same manner as in Example 1. After storage at 50° C. for four weeks, the resultant varnish exhibited a transparent appearance similar to the original polyamideimide resin varnish. The varnish exhibited an initial viscosity of 2,180 cps. The viscosity of the varnish was 2,180 cps after storage at 50° C. for two weeks, and the viscosity of the varnish was 2,200 cps after storage at 50° C. for four weeks.

Example 15

A 2 L eggplant-shaped flask was charged with 1,000 g of the silica sol dispersed in methanol described in Example 4 ($SiO_2$ concentration: 20.5% by mass, water content: 1.6% by mass, viscosity: 2 mPa·s). While the sol was stirred with a magnetic stirrer, 19.6 g of hexamethyldisiloxane (trade name: KF-96L, available from Shin-Etsu Chemical Co., Ltd.) was added, and the liquid temperature was maintained at 60° C. for three hours. Thereafter, while the solvent was distilled off with a rotary evaporator at a reduced pressure of 450 to 110 Torr and a bath temperature of 85 to 125° C., DMAC was fed, and the dispersion medium of the sol was replaced with DMAC, to thereby yield a silica sol dispersed in DMAC (silica concentration: 30.3% by mass, pH 3.8, viscosity (20° C.): 4.0 mPa·s, water content: 0.1% by mass, particle diameter as measured by dynamic light scattering: 27 nm, average primary particle diameter: 11 nm, amount of the bonded silane compound per unit area of the silica particle surfaces: 2.0 molecules/nm², amount of aluminum present in the entire silica particles ($Al_2O_3/SiO_2$): 5,619 ppm).

The resultant sol was used, and a silica-containing polyamideimide resin varnish (resin/$SiO_2$=85/15) was prepared in the same manner as in Example 1. After storage at 50° C. for four weeks, the resultant varnish exhibited a transparent appearance similar to the original polyamideimide resin varnish. The varnish exhibited an initial viscosity of 2,300 cps. The viscosity of the varnish was 2,160 cps after storage at 50° C. for two weeks, and the viscosity of the varnish was 2,160 cps after storage at 50° C. for four weeks.

Example 16

The reaction and the solvent replacement were performed in the same manner as in Example 4, except that DMAC was replaced with NMP (N-methyl-2-pyrrolidone) as the dispersion medium of the sol, to thereby yield a silica sol dispersed in NMP (silica concentration: 30.0% by mass, pH 4.8, viscosity (20° C.): 10 mPa·s, water content: 0.1% by mass, average primary particle diameter: 11 nm, amount of the bonded silane compound per unit area of the silica particle surfaces: 2.5 molecules/nm², amount of aluminum present in the entire silica particles ($Al_2O_3/SiO_2$): 5,797 ppm).

The resultant sol was used, and a silica-containing polyamideimide resin varnish (resin/SiO$_2$=85/15) was prepared in the same manner as in Example 1. After storage at 50° C. for four weeks, the resultant varnish exhibited a transparent appearance similar to the original polyamideimide resin varnish. The varnish exhibited an initial viscosity of 2,800 cps. The viscosity of the varnish was 2,720 cps after storage at 50° C. for two weeks, and the viscosity of the varnish was 2,660 cps after storage at 50° C. for four weeks.

Comparative Example 1

The process was performed in the same manner as in Example 7, except that the acidic silica sol (1) was replaced with the acidic silica sol (4), to thereby yield a silica sol dispersed in DMAC (silica concentration: 20.5% by mass, pH 4.5, viscosity (20° C.): 3 mPa·s, water content: 0.9% by mass, particle diameter as measured by dynamic light scattering: 18 nm, average primary particle diameter: 11 nm, amount of aluminum bonded to the silica particle surfaces (Al$_2$O$_3$/SiO$_2$): 760 ppm, amount of aluminum present in the entire silica particles (Al$_2$O$_3$/SiO$_2$): 2,300 ppm).

The resultant sol was used, and a silica-containing polyamideimide resin varnish (resin/SiO$_2$=85/15) was prepared in the same manner as in Example 1. The resultant varnish exhibited a turbid appearance from the beginning, and silica aggregation occurred. The varnish exhibited an initial viscosity of 2,000 cps. After storage at 50° C. for two weeks, the viscosity of the varnish was 2,400 cps, and the turbid appearance remained unchanged.

Comparative Example 2

The process was performed in the same manner as in Example 4, except that the acidic silica sol (1) was replaced with the acidic silica sol (4), to thereby yield a silica sol dispersed in DMAC (silica concentration: 30.5% by mass, pH 4.2, viscosity (20° C.): 4.3 mPa·s, water content: 0.1% by mass, particle diameter as measured by dynamic light scattering: 16 nm, average primary particle diameter: 11 nm, amount of the bonded silane compound per unit area of the silica particle surfaces: 2.5 molecules/nm$^2$, amount of aluminum bonded to the silica particle surfaces (Al$_2$O$_3$/SiO$_2$): 380 ppm, amount of aluminum present in the entire silica particles (Al$_2$O$_3$/SiO$_2$): 2,300 ppm).

The resultant sol was used, and a silica-containing polyamideimide resin varnish (resin/SiO$_2$=85/15) was prepared in the same manner as in Example 1. The resultant varnish initially exhibited a transparent appearance, but became turbid after storage at 50° C. for two weeks.

The varnish exhibited an initial viscosity of 2,240 cps. After storage at 50° C. for two weeks, the varnish exhibited a viscosity of 3,340 cps and a turbid appearance. After storage at 50° C. for four weeks, the viscosity of the varnish was 3,620 cps, and the turbid appearance remained unchanged.

Comparative Example 3

The process was performed in the same manner as in Example 10, except that the acidic silica sol (2) was replaced with the acidic silica sol (7), to thereby yield a silica sol dispersed in DMAC (silica concentration: 20.5% by mass, pH 4.0, viscosity (20° C.): 3.8 mPa·s, water content: 0.4% by mass, particle diameter as measured by dynamic light scattering: 14 nm, average primary particle diameter: 21 nm, amount of aluminum bonded to the silica particle surfaces (Al$_2$O$_3$/SiO$_2$): 450 ppm, amount of aluminum present in the entire silica particles (Al$_2$O$_3$/SiO$_2$): 2,570 ppm).

The resultant sol was used, and a silica-containing polyamideimide resin varnish (resin/SiO$_2$=85/15) was prepared in the same manner as in Example 1. The resultant varnish exhibited a turbid appearance from the beginning, and silica aggregation occurred. The varnish exhibited an initial viscosity of 1,800 cps. After storage at 50° C. for two weeks, the viscosity of the varnish was 2,100 cps, and the turbid appearance remained unchanged.

Comparative Example 4

The process was performed in the same manner as in Example 9, except that the acidic silica sol (2) was replaced with the acidic silica sol (7), to thereby yield a silica sol dispersed in DMAC (silica concentration: 30.5% by mass, pH 8.6, viscosity (20° C.): 9.8 mPa·s, water content: 0.3% by mass, particle diameter as measured by dynamic light scattering: 20 nm, average primary particle diameter: 21 nm, amount of the bonded silane compound per unit area of the silica particle surfaces: 1.0 molecule/nm$^2$, amount of aluminum bonded to the silica particle surfaces (Al$_2$O$_3$/SiO$_2$): 300 ppm, amount of aluminum present in the entire silica particles (Al$_2$O$_3$/SiO$_2$): 2,495 ppm).

The resultant sol was used, and a silica-containing polyamideimide resin varnish (resin/SiO$_2$=85/15) was prepared in the same manner as in Example 1. The resultant varnish exhibited a turbid appearance from the beginning, and silica aggregation occurred. The varnish exhibited an initial viscosity of 2,700 cps. After storage at 50° C. for two weeks, the viscosity of the varnish was 3,200 cps, and the turbid appearance remained unchanged.

Comparative Example 5

The process was performed in the same manner as in Example 10, except that the acidic silica sol (2) was replaced with the acidic silica sol (8), to thereby yield a silica sol dispersed in DMAC (silica concentration: 20.5% by mass, pH 4.3, viscosity (20° C.): 2 mPa·s, water content: 0.1% by mass, particle diameter as measured by dynamic light scattering: 90 nm, average primary particle diameter: 45 nm, amount of aluminum bonded to the silica particle surfaces (Al$_2$O$_3$/SiO$_2$): 460 ppm, amount of aluminum present in the entire silica particles (Al$_2$O$_3$/SiO$_2$): 2,500 ppm).

The resultant sol was used, and a silica-containing polyamideimide resin varnish (resin/SiO$_2$=85/15) was prepared in the same manner as in Example 1. The resultant varnish initially exhibited a transparent appearance, but became turbid after storage at 50° C. for two weeks.

The varnish exhibited an initial viscosity of 1,500 cps. After storage at 50° C. for two weeks, the varnish exhibited a viscosity of 2,240 cps and a turbid appearance. After storage at 50° C. for four weeks, the viscosity of the varnish was 2,640 cps, and the turbid appearance remained unchanged.

(Transparency Test of Silica-Containing Polyamideimide Resin Varnish)

A silica-containing polyamideimide varnish was added to a glass-made Petri dish so as to achieve a height of 3 mm. Two spacers having a height of 10 mm were placed apart from each other on a figure-printed paper sheet, and the Petri dish containing the aforementioned varnish was placed on the spacers. The transparency was evaluated based on whether or not characters in the figure were recognized when observed from above.

Figure 2:
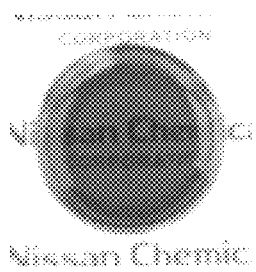
FIG. 2 is a photograph showing the results of a test for evaluation of the transparency of the silica-containing resin varnish of Example 8.
Figure 3:
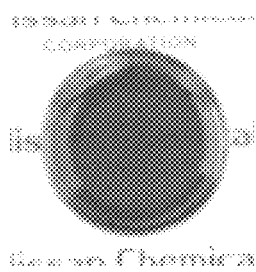
FIG. 3 is a photograph showing the results of a test for evaluation of the transparency of the silica-containing resin varnish of Comparative Example 1.
Figure 4:
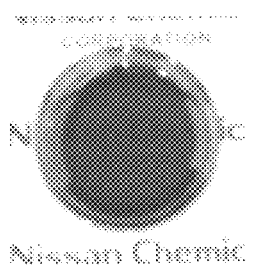
FIG. 4 is a photograph showing the results of a test for evaluation of the transparency of the silica-containing resin varnish of Comparative Example 4.
Figure 5:
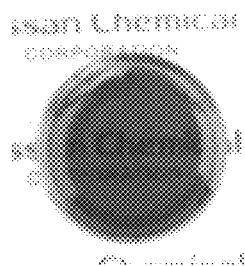
FIG. 5 is a photograph showing the results of a test for evaluation of the transparency of a resin varnish containing no silica (serving as a reference).

The characters can be recognized when the silica-containing polyamideimide resin varnish has high transparency. In the case of the silica-containing polyamideimide resin varnish of Example 4 or 8, the characters were clearly recognized similar to the case of a polyamideimide resin varnish serving as a reference. In contrast, in the case of the silica-containing polyamideimide resin varnish of Comparative Example 1 or 4, the characters were not recognized due to the turbidity of the varnish. FIGS. 1 to 5 are photographs showing the results. FIG. 1 is a photograph showing the results of the test for evaluation of the transparency of the silica-containing resin varnish of Example 4. FIG. 2 is a photograph showing the results of the test for evaluation of the transparency of the silica-containing resin varnish of Example 8. FIG. 3 is a photograph showing the results of the test for evaluation of the transparency of the silica-containing resin varnish of Comparative Example 1. FIG. 4 is a photograph showing the results of the test for evaluation of the transparency of the silica-containing resin varnish of Comparative Example 4. FIG. 5 is a photograph showing the results of the test for evaluation of the transparency of a resin varnish containing no silica (serving as a reference).

(Transparency Test of Cured Film of Silica-Containing Polyamideimide Resin)

A coating film of a silica-containing polyamideimide resin varnish was formed on a glass substrate with an applicator. The coating film was dried in a dryer at 250° C. for 45 minutes, to thereby form a cured film (thickness: 35 µm) of the silica-containing polyamideimide resin. Two spacers having a height of 10 mm were placed apart from each other on a figure-printed paper sheet, and the glass substrate provided with the aforementioned cured film was placed on the spacers. The transparency was evaluated based on whether or not the characters in the figure were recognized when observed from above.

Figure 6:
FIG. 6 is a photograph showing the results of a test for evaluation of the transparency of a cured product of the silica-containing resin varnish of Example 4.
Figure 7:
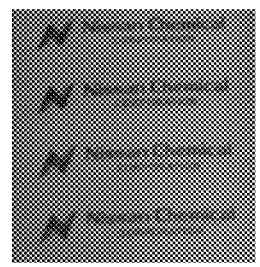
FIG. 7 is a photograph showing the results of a test for evaluation of the transparency of a cured product of the silica-containing resin varnish of Example 8.
Figure 8:
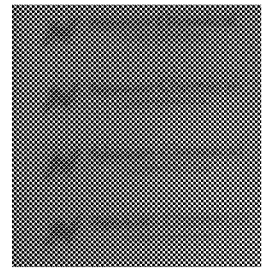
FIG. 8 is a photograph showing the results of a test for evaluation of the transparency of a cured product of the silica-containing resin varnish of Comparative Example 1.
Figure 9:
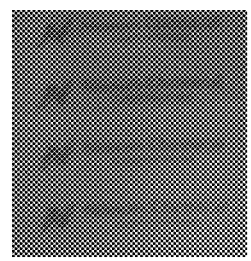
FIG. 9 is a photograph showing the results of a test for evaluation of the transparency of a cured product of the silica-containing resin varnish of Comparative Example 4.
Figure 10:
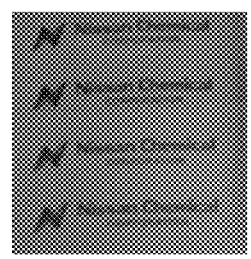
FIG. 10 is a photograph showing the results of a test for evaluation of the transparency of a cured product of the resin varnish containing no silica (serving as a reference).

The characters can be recognized when the cured film of the silica-containing polyamideimide resin has high transparency. In the case of the cured film formed from the silica-containing polyamideimide resin varnish of Example 4 or 8, the characters were clearly recognized similar to the case of the cured film formed from the polyamideimide resin varnish serving as a reference. In contrast, in the case of the cured film formed form the silica-containing polyamideimide resin varnish of Comparative Example for 4, the characters were not recognized due to the turbidity of the cured film. FIG. 6 is a photograph showing the results of the test for evaluation of the transparency of the cured product of the silica-containing resin varnish of Example 4. FIG. 7 is a photograph showing the results of the test for evaluation of the transparency of the cured product of the silica-containing resin varnish of Example 8. FIG. 8 is a photograph showing the results of the test for evaluation of the transparency of the cured product of the silica-containing resin varnish of Comparative Example 1. FIG. 9 is a photograph showing the results of the test for evaluation of the transparency of the cured product of the silica-containing resin varnish of Comparative Example 4. FIG. 10 is a photograph showing the results of the test for evaluation of the transparency of the cured product of the resin varnish containing no silica (serving as a reference).

(Preparation of Insulating Resin Composition)

Example E1

A 10 L plastic container was charged with 1.0 kg of the silica sol dispersed in DMAC prepared in Example 3. While the silica sol was stirred with a mechanical stirrer, 6.5 kg of a polyamideimide insulating resin varnish (trade name: HPC-5012-32, available from Showa Denko Materials Co., Ltd., resin solid content: 32% by mass, NMP solvent) was added, and the resultant mixture was stirred at room temperature for two hours, to thereby yield a silica sol-containing polyamideimide resin varnish (resin/$SiO_2$=85/15).

Example E2

A 10 L plastic container was charged with 1.0 kg of the silica sol dispersed in DMAC prepared in Example 8. While the silica sol was stirred with a mechanical stirrer, 6.5 kg of a polyamideimide insulating resin varnish (trade name: HPC-5012-32, available from Showa Denko Materials Co., Ltd., resin solid content: 32% by mass, NMP solvent) was added, and the resultant mixture was stirred at room temperature for two hours, to thereby yield a silica sol-containing polyamideimide resin varnish (resin/$SiO_2$=85/15).

Example E3

A 10 L plastic container was charged with 0.5 kg of the silica sol dispersed in DMAC prepared in Example 3 and 0.4 kg of DMAC. While the mixture was stirred with a mechanical stirrer, 6.1 kg of a polyamideimide insulating resin varnish was added, and the resultant mixture was stirred at room temperature for two hours, to thereby yield a silica sol-containing polyamideimide resin varnish (resin/$SiO_2$=93/7).

Example E4

A 10 L plastic container was charged with 1.0 kg of the silica sol dispersed in DMAC prepared in Example 14. While the silica sol was stirred with a mechanical stirrer, 6.0 kg of a polyamideimide insulating resin varnish was added, and the resultant mixture was stirred at room temperature for two hours, to thereby yield a silica sol-containing polyamideimide resin varnish (resin/$SiO_2$=90/10).

(Formation and Evaluation of Insulation-Coated Conductor Wire)

A polyamideimide resin varnish (trade name: HPC-5012-32, available from Showa Denko Materials Co., Ltd.) was applied onto a copper conductor (diameter: 0.4 mm) and then baked, to thereby form an insulating layer having a thickness of 4 µm. Thereafter, each of the silica sol-containing polyamideimide resin varnishs prepared in Examples E1 to E4 above was applied and baked, to thereby finally form an insulating conductor wire provided with an insulation coating layer having a thickness of 23 µm.

For Referential Example, a polyamideimide insulating resin varnish (trade name: HPC-5012-32, available from Showa Denko Materials Co., Ltd.) was applied onto a copper conductor (diameter: 0.4 mm) and then baked, to thereby form an insulating conductor wire provided with an insulation coating layer having a thickness of 23 µm.

The above-formed insulating conductor wires were evaluated for flexibility, dielectric breakdown voltage, and insulation life (V-t test). Methods and conditions for evaluation are described below.

(Flexibility)

The winding diameter where no cracks occurred in the coating (i.e., acceptance) was examined according to JIS C 3216-3 section 5 (the examination was performed on non-elongated and 20% elongated enamel wires).

In the flexibility test (no elongation), a non-elongated insulating conductor wire was wound around a rod having a diameter 1 to 10 times the diameter of the conductor of the insulating conductor wire, and an optical microscope was used to measure the minimum winding diameter where no cracks occurred in the insulation coating.

In the flexibility test (20% elongation), an insulating conductor wire was 20% elongated, and then the elongated conductor wire was tested in the same manner as in the aforementioned flexibility test (no elongation).

The results of the flexibility test are as follows: (1d) the minimum winding diameter where no cracks occur corresponds to its own diameter; (2d) the minimum winding diameter where no cracks occur corresponds to twice the own diameter; and (3d) the minimum winding diameter where no cracks occur corresponds to three times the own diameter. The smaller the minimum winding diameter d, the better the flexibility.

(Dielectric Breakdown Voltage)

According to JIS C 3216-5 section 4, an AC voltage (50 Hz) was applied between two wires of a twisted pair test piece wherein the distance between the wires was maintained at 50 mm, and the voltage at the time of dielectric breakdown was measured (increasing voltage: 500 V/s, dielectric breakdown detection current: 5 mA).

(V-T test)

According to JIS C 3216-5 section 4, a twisted pair test piece was prepared, and the below-described voltage was applied at a temperature of 155° C. between two wires of the test piece wherein the distance between the wires was maintained at 50 mm. The time until dielectric breakdown occurred was measured.

Frequency: 10 kHz rectangular wave
Pulse width: 5 μs
Bipolar
Pulse rise time: 80 ns

TABLE 1

| | Example E1 | Example E2 | Example E3 |
|---|---|---|---|
| Amount of silica contained in insulation coating layer (% by mass) | 15 | 15 | 7 |
| Flexibility (no elongation) | 1 d | 1 d | 1 d |
| Flexibility (20% elongation) | 2 d | 1 d | 1 d |
| Dielectric breakdown voltage (kV) | 7.8 | 9.8 | 8.5 |
| Insulation life (hours) measured at 1.5 kVp | 8.9 | 1.2 | 0.4 |
| Insulation life (hours) measured at 1.2 kVp | 25.7 | 6.8 | 2.1 |
| Insulation life (hours) measured at 0.9 kVp | 213 | 19.6 | 6.8 |

TABLE 2

| | Example E4 | Referential Example 1 |
|---|---|---|
| Amount of silica contained in insulation coating layer (% by mass) | 10 | 0 |
| Flexibility (no elongation) | 1 d | 1 d |
| Flexibility (20% elongation) | 2 d | 1 d |
| Dielectric breakdown voltage (kV) | 9.7 | 9.7 |
| Insulation life (hours) measured at 1.5 kVp | 9.7 | 0.08 |
| Insulation life (hours) measured at 1.2 kVp | 57.3 | 0.12 |
| Insulation life (hours) measured at 0.9 kVp | 74.2 | 0.17 |

The Referential Example corresponds to a composition containing only the polyamideimide insulating resin varnish.

The insulating conductor wire formed in Example 1 maintained mechanical properties and exhibited considerably increased insulation life, as compared with the conductor wire coated with the polyamideimide containing no silica.

INDUSTRIAL APPLICABILITY

The present invention enables production of a silica sol dispersed in a nitrogen-containing solvent for compatibly mixing silica particles with a polar resin such as a polyimide or polyamide resin. The present invention provides a resin composition containing the silica sol and a resin. When the resin composition is an insulating resin composition, the present invention provides an insulation-coated conductor wire having high insulation resistance.

The invention claimed is:

1. A silica sol comprising silica particles containing aluminum atoms and having an average primary particle diameter of 5 to 100 nm, the silica particles being dispersed in a nitrogen-containing solvent,
wherein the aluminum atoms are bonded to the surfaces of the silica particles in an amount in terms of $Al_2O_3$ of 800 to 20,000 $ppm/SiO_2$ as measured by a leaching process in which the silica particles are leached with an aqueous solution of at least one mineral acid selected from the group consisting of sulfuric acid, nitric acid, and hydrochloric acid, and
the amount of the aluminum atoms present in the entire silica particles in terms of $Al_2O_3$ is 2,700 to 30,000 $ppm/SiO_2$ as measured by a process in which the silica particles are dissolved in an aqueous hydrofluoric acid solution.

2. The silica sol according to claim 1, wherein the silica particles are bonded to at least one silane compound selected from the group consisting of silane compounds of the following Formulae (1) to (3) or a hydrolysate of the silane compound:

  Formula (1)

  Formula (2)

  Formula (3)

wherein in Formula (1), $R^1$ is a phenyl group or an organic group containing a phenyl group, an amino group or an organic group containing an amino group, a (meth)acryloyl group or an organic group containing a (meth)acryloyl group, a vinyl group or an organic group containing a vinyl group, a $C_{1-10}$ alkyl group containing a halogen atom if necessary, or any combination of these; $R^2$ is an alkoxy group, an acyloxy group, or a halogen group; and a is an integer of 1 to 3; and
in Formulae (2) and (3), $R^3$ and $R^5$ are each a $C_{1-3}$ alkyl group or a $C_{6-30}$ aryl group and bonded to a silicon atom via an Si—C bond; $R^4$ and $R^6$ are each an alkoxy group, an acyloxy group, or a halogen group; Y is an alkylene group, an NH group, or an oxygen atom; b is an integer of 1 to 3; c is an integer of 0 or 1; and d is an integer of 1 to 3.

3. The silica sol according to claim 2, wherein the silane compound of Formula (1) is bonded to the surfaces of the silica particles such that the amount of the silane compound per unit area of the surfaces of the silica particles is 0.5 to 5.0 molecules/$nm^2$.

4. The silica sol according to claim 1, wherein the amount of the aluminum atoms bonded to the surfaces of the silica particles in terms of $Al_2O_3$ is 800 to 20,000 ppm/$SiO_2$ as measured by a leaching process in which the silica particles are leached with an aqueous solution of at least one mineral acid selected from the group consisting of sulfuric acid, nitric acid, and hydrochloric acid.

5. The silica sol according to claim 1, wherein the amount of negative charge present on the surfaces of the silica particles is 0.25 to 0.45 μeq/m².

6. The silica sol according to claim 1, wherein the nitrogen-containing solvent is an amide solvent.

7. The silica sol according to claim 1, wherein the nitrogen-containing solvent is dimethylacetamide, dimethylformamide, N-methylpyrrolidone, or N-ethylpyrrolidone.

8. A composition comprising the silica sol according to claim 1 and a nitrogen-containing polymer.

9. An insulating resin composition comprising the silica sol according to claim 1 and a nitrogen-containing polymer.

10. The composition according to claim 8, wherein the amount of the nitrogen-containing polymer is 1 to 100 parts by mass relative to 1 part by mass of the silica particles contained in the silica sol.

11. The composition according to claim 8, wherein the nitrogen-containing polymer is polyimide, polyamide, polyamic acid, polyamideimide, polyetherimide, or polyesterimide.

12. The composition according to claim 8, wherein the viscosity of the composition after being stored at 50° C. for two weeks is 0.80 to 1.05 times the initial viscosity thereof measured at 25° C.

13. An insulation-coated conductor wire produced by insulation coating of a conductor wire with the insulating resin composition according to claim 9.

14. An insulation-coated conductor wire produced by insulation coating of a conductor wire with the insulating resin composition according to claim 9 wherein the concentration of the silica particles in the nitrogen-containing solvent is adjusted to 15% by mass, so as to form an insulation coating layer having a thickness of 23 μm, wherein the insulation coating layer of the insulation-coated conductor wire exhibits a flexibility of 1 d to 2d.

15. An insulation-coated conductor wire produced by insulation coating of a conductor wire with the insulating resin composition according to claim 9 wherein the concentration of the silica particles in the nitrogen-containing solvent is adjusted to 15% by mass, so as to form an insulation coating layer having a thickness of 23 μm, wherein the insulation-coated conductor wire exhibits an insulation life of 0.2 hours to 20 hours as measured at an applied pulse voltage of 1.5 kVp, bipolar, and a 10 kHz rectangular wave.

16. A method for producing the silica sol according to claim 1, the method comprising the following steps (A) and (B):
   step (A): a step of preparing an aqueous silica sol having an average primary particle diameter of 5 to 100 nm, wherein aluminum atoms are bonded to the surfaces of the silica particles in an amount in terms of $Al_2O_3$ of 800 to 20,000 ppm/$SiO_2$, and
   step (B): a step of replacing the solvent of the silica sol prepared in the step (A) with a nitrogen-containing solvent.

17. The method for producing the silica sol according to claim 16, wherein the aqueous silica sol of the step (A) is prepared by subjecting an aqueous alkali silicate solution containing aluminum atoms to cation exchange through contact of the aqueous alkali silicate solution with a cation exchange resin, and heating the resultant active silicic acid at 80 to 300° C.

18. The method for producing the silica sol according to claim 16, wherein the aqueous silica sol of the step (A) is prepared by heating an aqueous silica sol containing aluminum atoms in the form of an aluminate salt at 80 to 300° C.

19. The method for producing the silica sol according to claim 16, wherein the method comprises, after the step (A), a step (A-1) of reacting the silica sol prepared in the step (A) with a silane compound of Formula (1):

$$R^1_a Si(R^2)_{4-a} \qquad \text{Formula (1)}$$

wherein $R^1$ is a phenyl group or an organic group containing a phenyl group, an amino group or an organic group containing an amino group, a (meth)acryloyl group or an organic group containing a (meth)acryloyl group, a vinyl group or an organic group containing a vinyl group, a $C_{1-10}$ alkyl group containing a halogen atom if necessary, or any combination of these; $R^2$ is an alkoxy group, an acyloxy group, or a halogen group; and a is an integer of 1 to 3.

20. The method for producing the silica sol according to claim 16, wherein the water contained in the aqueous silica sol prepared in the step (A) is replaced with methanol after the step (A).

21. The method for producing the silica sol according to claim 16, wherein the aqueous silica sol of the step (A) is prepared by subjecting an aqueous alkali silicate solution containing aluminum atoms in the form of an aluminate salt to cation exchange through contact of the aqueous alkali silicate solution with a cation exchange resin, and heating the resultant active silicic acid at 80 to 300° C.

22. The method for producing the silica sol according to claim 19, wherein the water contained in the aqueous silica sol prepared in the step (A-1) is replaced with methanol after the step (A-1).

* * * * *